US011863795B2

(12) United States Patent
Wang

(10) Patent No.: US 11,863,795 B2
(45) Date of Patent: Jan. 2, 2024

(54) GRADUAL DECODING REFRESH ACCESS UNIT IN SCALABLE VIDEO CODING

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/944,332

(22) Filed: Sep. 14, 2022

(65) Prior Publication Data

US 2023/0012183 A1 Jan. 12, 2023

Related U.S. Application Data

(63) Continuation of application No. PCT/US2021/022404, filed on Mar. 15, 2021.

(60) Provisional application No. 62/990,387, filed on Mar. 16, 2020.

(51) Int. Cl.

*H04N 19/70* (2014.01)
*H04N 19/172* (2014.01)
*H04N 19/169* (2014.01)
*H04N 19/46* (2014.01)

(Continued)

(52) U.S. Cl.

CPC ........... *H04N 19/70* (2014.11); *H04N 19/172* (2014.11); *H04N 19/184* (2014.11); *H04N 19/187* (2014.11); *H04N 19/188* (2014.11); *H04N 19/46* (2014.11)

(58) Field of Classification Search

CPC ... H04N 19/187; H04N 19/172; H04N 19/184
See application file for complete search history.

(56) References Cited

U.S. PATENT DOCUMENTS

2008/0007438 A1* 1/2008 Segall .................... H04N 19/48 375/E7.199
2008/0211901 A1 9/2008 Civanlar et al.
2010/0232520 A1 9/2010 Wu et al.

(Continued)

FOREIGN PATENT DOCUMENTS

EP 3086556 A1 10/2016
WO 2016098056 A1 6/2016
WO 2019038473 A1 2/2019

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

*Primary Examiner* — Tracy Y. Li
(74) *Attorney, Agent, or Firm* — Conley Rose, P.C.

(57) ABSTRACT

Methods, devices and systems for configuring different access units in scalable video coding are described. In one example aspect, a method of video processing include performing a conversion between a video including one or more pictures in one or more video layers and a bitstream of a video. The bitstream includes a coded video sequence that includes one or more access units. The bitstream conforms to a format rule that specifies that each access unit of the one or more access units that is a gradual decoding refresh access unit includes exactly one picture for each video layer present in the coded video sequence.

18 Claims, 13 Drawing Sheets

(51) Int. Cl.
*H04N 19/184* (2014.01)
*H04N 19/187* (2014.01)

(56) References Cited

U.S. PATENT DOCUMENTS

| | | | | |
|---|---|---|---|---|
| 2011/0134994 | A1 | 6/2011 | Lu et al. | |
| 2013/0077681 | A1 | 3/2013 | Chen et al. | |
| 2013/0294500 | A1 | 11/2013 | Wang | |
| 2014/0079138 | A1 | 3/2014 | Auyeung et al. | |
| 2014/0192896 | A1 | 7/2014 | Wang et al. | |
| 2014/0198857 | A1 | 7/2014 | Deshpande | |
| 2014/0219346 | A1 | 8/2014 | Ugur et al. | |
| 2014/0301485 | A1 | 10/2014 | Ramasubramoni et al. | |
| 2015/0195555 | A1* | 7/2015 | Hendry | H04N 19/52 375/240.16 |
| 2016/0044309 | A1 | 2/2016 | Choi | |
| 2017/0310989 | A1 | 10/2017 | Ugur | |
| 2019/0373276 | A1 | 12/2019 | Hu et al. | |
| 2021/0067834 | A1 | 3/2021 | Li | |
| 2022/0408080 | A1* | 12/2022 | Sánchez De La Fuente | H04N 19/70 |

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Nov. 2019, 712 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., VTM software, https://vcgit.hhi.fraunhofer.de/jvet/VVCSoftware_VTM.git, Dec. 5, 2022, 3 pages.

Schwarz, H., et al. "Overview of the scalable video coding extension of the H. 264/AVC standard," IEEE Transactions on circuits and systems for video technology, vol. 17, No. 9, Sep. 2007, 18 pages.

Wang, Y.K., et al., "RTP Payload Format for High Efficiency Video Coding (HEVC)," Internet Engineering Task Force (IETF), RFC 7798, Mar. 2016, 86 pages.

Foreign Communication From A Related Counterpart Application, International Application No. PCT/US2021/022400, International Search Report dated Jun. 11, 2021, 14 pages.

Foreign Communication From A Related Counterpart Application, International Application No. PCT/US2021/022404, International Search Report dated Jun. 3, 2021, 9 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

Document: JVET-Q0154, Coban, M., et al., "AHG9: On picture header IRAP/GDR signalling," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JVET-R0065-v1, Wang, Y., "AHG8/AHG9: On IRAP and GDR AUs," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Non-Final Office Action dated Feb. 22, 2023, 18 pages, U.S. Appl. No. 17/943,366, filed Sep. 13, 2022.

Foreign Communication From A Related Counterpart Application, European Application No. 21771747.9, Extended European Search Report dated Mar. 30, 2023, 12 pages.

Foreign Communication From A Related Counterpart Application, Indian Application No. 202227053036, Indian Office Action dated Feb. 24, 2023, 6 pages.

* cited by examiner

GRADUAL DECODING REFRESH ACCESS UNIT IN SCALABLE VIDEO CODING

CROSS-REFERENCE TO RELATED APPLICATIONS

This application is a continuation of International Patent Application No. PCT/US2021/022404 filed on Mar. 15, 2021, which claims the priority to and benefits of U.S. Provisional Patent Application No. U.S. 62/990,387 filed on Mar. 16, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that include configuring different access units in scalable video coding and that can be used by video encoders and decoders for processing coded representation of video using control information useful for decoding of the coded representation.

In one example aspect, a video processing method is disclosed. The method includes performing a conversion between a video comprising one or more pictures in one or more video layers and a bitstream of a video, wherein the bitstream comprises a coded video sequence that includes one or more access units, and wherein the bitstream further comprises a first syntax element indicating whether an access unit includes a picture for each video layer making up the coded video sequence.

In another example aspect, a video processing method is disclosed. The method includes performing a conversion between a video comprising one or more pictures in one or more video layers and a bitstream of the video, wherein the bitstream comprises a coded video sequence that includes one or more access units, and wherein the bitstream conforms to a format rule that specifies that each picture in a given access unit carries a layer identifier that is equal to a layer identifier of a first access unit of the coded video sequence comprising the one or more video layers.

In yet another example aspect, a video processing method is disclosed. The method includes performing, a conversion between a video comprising one or more pictures in one or more video layers and a bitstream of a video, wherein the bitstream comprises a coded video sequence that includes one or more access units, and wherein the bitstream further comprises a first syntax element indicative of an access unit of the one or more access units starting a new coded video sequence.

In yet another example aspect, a video processing method is disclosed. The method includes performing a conversion between a video comprising one or more pictures in one or more video layers and a bitstream of the video, wherein the bitstream comprises a coded video sequence that includes one or more access units, and wherein the bitstream conforms to a format rule that specifies that a coded video sequence start access unit, which starts a new coded video sequence, comprises a picture for each video layer specified in a video parameter set.

In yet another example aspect, a video processing method is disclosed. The method includes performing a conversion between a video comprising one or more pictures in one or more video layers and a bitstream of the video, wherein the bitstream comprises a coded video sequence that includes one or more access units, and wherein the bitstream conforms to a format rule that specifies that a given access unit is identified as a coded video sequence start access unit based on the given access unit being a first access unit in the bitstream or an access unit previous to the given access unit comprising end of sequence network abstraction layer units.

In yet another example aspect, a video processing method is disclosed. The method includes performing, based on a rule, a conversion between a video comprising one or more pictures in one or more video layers and a bitstream of the video, wherein the bitstream comprises a coded video sequence that includes one or more access units, and wherein the rule specifies that side information is used to indicate whether an access unit of the one or more access units is a coded video sequence start access unit.

In yet another example aspect, a video processing method is disclosed. The method includes performing a conversion between a video comprising one or more pictures in one or more video layers and a bitstream of a video, wherein the bitstream comprises a coded video sequence that includes one or more access units, and wherein the bitstream conforms to a format rule that specifies that each access unit of the one or more access units that is a gradual decoding refresh access unit includes exactly one picture for each video layer present in the coded video sequence.

In yet another example aspect, a video processing method is disclosed. The method includes performing a conversion between a video comprising one or more pictures in one or more video layers and a bitstream of a video, wherein the bitstream comprises a coded video sequence that includes one or more access units, and wherein the bitstream conforms to a format rule that specifies that each access unit of the one or more access units that is an intra random access points access unit includes exactly one picture for each video layer present in the coded video sequence.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
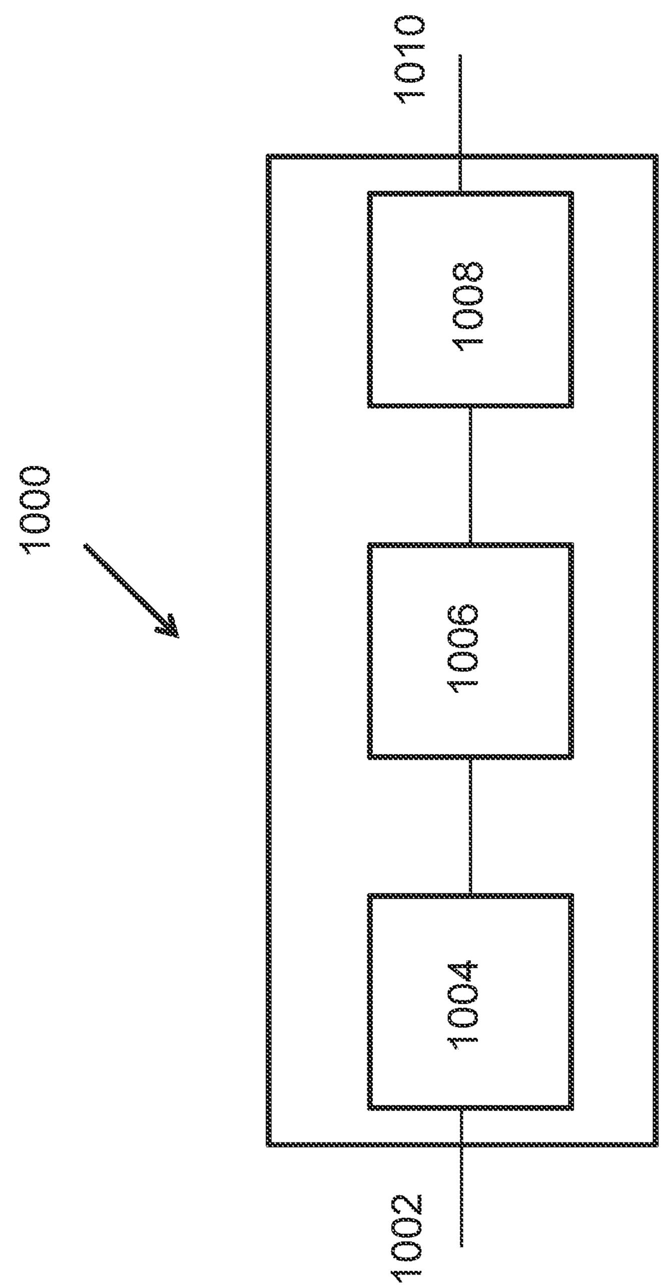
FIG. 1 is a block diagram showing an example video processing system in which various techniques disclosed herein may be implemented.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This document is related to video coding technologies. Specifically, it is about specifying and signaling of random access point access unit in scalable video coding, wherein a video bitstream can contains more than one layer. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
NUT NAL Unit Type
OLS Output Layer Set
PH Picture Header
PPS Picture Parameter Set
PTL Profile, Tier and Level
PU Picture Unit
RADL Random Access Decodable Leading
RASL Random Access Skipped Leading
RAP Random Access Point
RB SP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. Video Coding Introduction

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (TRAP) pictures in the NAL unit header, through NAL unit types. Three types of TRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of TRAP pictures, altogether six different NAL units are defined to signal the properties of the TRAP pictures, which can be used to better match the stream access point types as defined in the ISO base media file format (ISOBMFF), which are utilized for random access support in dynamic adaptive streaming over HTTP (DASH).

VVC supports three types of TRAP pictures, two types of IDR pictures (one type with or the other type without associated RADL pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

TRAP pictures and GDR pictures can be collectively referred to as random access point (RAP) pictures.

3.2. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high-level syntax (HLS) aspects have been significantly simplified at the sacrifice of some flexibilities. For example, an IRAP AU is required to contain a picture for each of the layers present in the CVS.

3.3. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaled of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. Related Definitions in in VVC

Related definitions in the latest VVC text (in WET-Q2001-Ve/v15) are as follows.

Associated IRAP picture (of a particular picture): The previous IRAP picture in decoding order (when present) having the same value of nuh_layer_id as the particular picture.

Coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.

Coded video sequence start (CVSS) AU: An AU in which there is a PU for each layer in the CVS and the coded picture in each PU is a CLVSS picture.

Gradual decoding refresh (GDR) AU: An AU in which the coded picture in each present PU is a GDR picture.

Gradual decoding refresh (GDR) PU: A PU in which the coded picture is a GDR picture.

Gradual decoding refresh (GDR) picture: A picture for which each VCL NAL unit has nal_unit_type equal to GDR_NUT.

Intra random access point (IRAP) AU: An AU in which there is a PU for each layer in the CVS and the coded picture in each PU is an IRAP picture.

Intra random access point (IRAP) picture: A coded picture for which all VCL NAL units have the same value of nal_unit_type in the range of IDR_W_RADL to CRA_NUT, inclusive.

3.5. VPS Syntax and Semantics in VVC

VVC supports scalability, also known as scalable video coding, wherein multiple layers can be encoded in one coded video bitstream.

In the latest VVC text (in JVET-Q2001-Ve/v15), the scalability information is signaled in the VPS, for which the syntax and semantics are as follows.

7.3.2.2 Video parameter set syntax

| | Descriptor |
|---|---|
| video_parameter_set_rbsp( ) { | |
| vps_video_parameter_set_id | u(4) |
| vps_max_layers_minus1 | u(6) |
| vps_max_sublayers_minus1 | u(3) |
| if( vps_max_layers_minus1 > 0 && vps_max_sublayers_minus1 > 0 ) | |
| vps_all_layers_same_num_sublayers_flag | u(1) |
| if( vps_max_layers_minus1 > 0 ) | |
| vps_all_independent_layers_flag | u(1) |
| for( I = 0; I <= vps_max_layers_minus1; i++ ) { | |
| vps_layer_id[ I ] | u(6) |
| if( I > 0 && !vps_all_independent_layers_flag ) { | |
| vps_independent_layer_flag[ I ] | u(1) |
| if( !vps_independent_layer_flag[ I ] ) { | |
| for( j = 0; j < I; j++ ) | |
| vps_direct_ref_layer_flag[ I ][ j ] | u(1) |
| max_tid_ref_present_flag[ I ] | u(1) |
| if( max_tid_ref_present_flag[ I ] ) | |
| max_tid_il_ref_pics_plus1 [ I ] | u(3) |
| } | |
| } | |
| } | |
| if( vps_max_layers_minus1 > 0 ) { | |
| if( vps_all_independent_layers_flag ) | |
| each_layer_is_an_ols_flag | u(1) |
| if( !each_layer_is_an_ols_flag ) { | |
| if( !vps_all_independent_layers_flag ) | |
| ols_mode_idc | u(2) |
| if( ols_mode_idc = = 2 ) { | |
| num_output_layer_sets_minus1 | u(8) |
| for( I = 1; I <= num_output_layer_sets_minus1; I++) | |
| for( j = 0; j <= vps_max_layers_minus1; j++ ) | |
| ols_output_layer_flag[ I ][ j ] | u(1) |
| } | |
| } | |
| } | |
| vps_num_ptls_minus1 | u(8) |
| for( I = 0; I <= vps_num_ptls_minus1; i++ ) { | |
| if(I > 0 ) | |
| pt_present_flag[ I ] | u(1) |
| if( vps_max_sublayers_minus1 > 0 && !vps_all_layers_same_num_sublayers_flag ) | |

-continued

| 7.3.2.2 Video parameter set syntax | |
|---|---|
| | Descriptor |
| ptl_max_temporal_id[ I ] | u(3) |
| } | |
| while( !byte_aligned( ) ) | |
| vps_ptl_alignment_zero_bit /* equal to 0 */ | f(1) |
| for( I = 0; I <= vps_num_ptls_minus1; i++ ) | |
| profile_tier_level( pt_present_flag[ I ], ptl_max_temporal_id[ I ] ) | |
| for( I = 0; I < TotalNumOlss; i++ ) | |
| if( vps_num_ptls_minus1 > 0 ) | |
| ols_ptl_idx[ I ] | u(8) |
| if( !vps_all_independent_layers_flag ) | |
| vps_num_dpb_params | ue(v) |
| if( vps_num_dpb_params > 0 && vps_max_sublayers_minus1 > 0 ) | |
| vps_sublayer_dpb_params_present_flag | u(1) |
| for( I = 0; I < vps_num_dpb_params; i++ ) { | |
| if( vps_max_sublayers_minus1 > 0 && !vps_all_layers_same_num_sublayers_flag ) | |
| dpb_max_temporal_id[ I ] | u(3) |
| dpb_parameters( dpb_max_temporal_id[ I ], vps_sublayer_dpb_params_present_flag ) | |
| } | |
| for( I = 0; I < TotalNumOlss; i++ ) { | |
| if( NumLayersInOls[ I ] > 1 ) { | |
| ols_dpb_pic_width[ I ] | ue(v) |
| ols_dpb_pic_height[ I ] | ue(v) |
| if( vps_num_dpb_params > 1 ) | |
| ols_dpb_params_idx[ I ] | ue(v) |
| } | |
| } | |
| if( !each_layer_is_an_ols_flag ) | |
| vps_general_hrd_params_present_flag | u(1) |
| if( vps_general_hrd_params_present_flag ) { | |
| general_hrd_parameters( ) | |
| if( vps_max_sublayers_minus1 > 0 ) | |
| vps_sublayer_cpb_params_present_flag | u(1) |
| num_ols_hrd_params_minus1 | ue(v) |
| for( I = 0; I <= num_ols_hrd_params_minus1; i++ ) { | |
| if( vps_max_sublayers_minus1 > 0 && !vps_all_layers_same_num_sublayers_flag ) | |
| hrd_max_tid[ I ] | u(3) |
| firstSubLayer = vps_sublayer_cpb_params_present_flag ? 0 : hrd_max_tid[ I ] | |
| ols_hrd parameters( firstSubLayer, hrd_max_tid[ I ] ) | |
| } | |
| if( num_ols_hrd_params_minus1 + 1 != TotalNumOlss && num_ols_hrd_params_minus1 > 0 ) | |
| for( I = 1; I < TotalNumOlss; i++ ) | |
| if( NumLayersInOls[ I ] > 1 ) | |
| ols_hrd_idx[ I ] | ue(v) |
| } | |
| vps_extension_flag | u(1) |
| if( vps_extension_flag ) | |
| while( more_rbsp_data( ) ) | |
| vps_extension_data_flag | u(1) |
| rbsp_trailing_bits( ) | |
| } | |

7.4.3.2 Video Parameter Set RBSP Semantics

A VPS RBSP shall be available to the decoding process prior to it being referenced, included in at least one AU with TemporalId equal to 0 or provided through external means.

All VPS NAL units with a particular value of vps_video_parameter_set_id in a CVS shall have the same content.

Vps_video_parameter_set_id provides an identifier for the VPS for reference by other syntax elements. The value of vps_video_parameter_set_id shall be greater than 0.

Vps_max_layers_minus1 plus 1 specifies the maximum allowed number of layers in each CVS referring to the VPS.

Vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.

Vps_all_layers_same_num_sublayers_flag equal to 1 specifies that the number of temporal sublayers is the same for all the layers in each CVS referring to the VPS. Vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

Vps_all_independent_layers_flag equal to 1 specifies that all layers in the CVS are independently coded without using inter-layer prediction. Vps_all_independent_layers_flag equal to 0 specifies that one or more of the layers in the CVS may use inter-layer prediction. When not present, the value of vps_all_independent_layers_flag is inferred to be equal to 1.

Vps_layer_id[I] specifies the nuh_layer_id value of the i-th layer. For any two non-negative integer values of m and n, when m is less than n, the value of vps_layer_id[m] shall be less than vps_layer_id[n].

Vps_independent_layer_flag[I] equal to 1 specifies that the layer with index I does not use inter-layer prediction. Vps_independent_layer_flag[I] equal to 0 specifies that the layer with index I may use inter-layer prediction and the syntax elements vps_direct_ref_layer_flag[I][j] for j in the range of 0 to I−1, inclusive, are present in VPS. When not present, the value of vps_independent_layer_flag[I] is inferred to be equal to 1.

Vps_direct_ref_layer_flag[I][j] equal to 0 specifies that the layer with index j is not a direct reference layer for the layer with index i. vps_direct_ref_layer_flag [I][j] equal to 1 specifies that the layer with index j is a direct reference layer for the layer with index i. When vps_direct_ref_layer_flag [I][j] is not present for I and j in the range of 0 to vps_max_layers_minus1, inclusive, it is inferred to be equal to 0. When vps_independent_layer_flag[I] is equal to 0, there shall be at least one value of j in the range of 0 to I−1, inclusive, such that the value of vps_direct_ref_layer_flag [I][j] is equal to 1.

The variables NumDirectRefLayers[I], DirectRefLayerIdx [I][d], NumRefLayers[I], RefLayerIdx[I][r], and LayerUsedAsRefLayerFlag[j] are derived as follows:

```
for( I = 0; I <= vps_max_layers_minus1; i++ ) {
  for( j = 0; j <= vps_max_layers_minus1; j++ ) {
    dependencyFlag[ I ][ j ] = vps_direct_ref_layer_flag[ I ][ j ]
    for( k = 0; k < I; k++ )
      if( vps_direct_ref_layer_flag[ I ][ k ] && dependencyFlag[ k ][ j ]
)
        dependencyFlag[ I ][ j ] = 1
  }
  LayerUsedAsRefLayerFlag[ I ] = 0
}
for( I = 0; I <= vps_max_layers_minus1; i++ ) {
  for(j = 0, d = 0, r = 0; j <= vps_max_layers_minus1; j++ ) {       (37)
    if( vps_direct_ref_layer_flag[ I ][ j ] ) {
      DirectRefLayerIdx[ I ][ d++ ] = j
      LayerUsedAsRefLayerFlag[ j ] = 1
    }
    if( dependencyFlag[ I ][ j ] )
      RefLayerIdx[ I ][ r++ ] = j
  }
  NumDirectRefLayers[ I ] = d
  NumRefLayers[ I ] = r
}
```

The variable GeneralLayerIdx[I], specifying the layer index of the layer with nuh_layer_id equal to vps_layer_id[I], is derived as follows:

for(*I*=0;*I*<=*vps*_max_layers_minus1;*i*++) GeneralLayerIdx[*vps*_layer_*id*[*I*]]=*i* (38)

For any two different values of I and j, both in the range of 0 to vps_max_layers_minus1, inclusive, when dependencyFlag[I][j] equal to 1, it is a requirement of bitstream conformance that the values of chroma_format_idc and bit_depth_minus8 that apply to the i-th layer shall be equal to the values of chroma_format_idc and bit_depth_minus8, respectively, that apply to the j-th layer.

Max_tid_ref_present_flag[I] equal to 1 specifies that the syntax element max_tid_il_ref_pics_plus1[I] is present. Max_tid_ref_present_flag[I] equal to 0 specifies that the syntax element max_tid_il_ref_pics_plus1[I] is not present. Max_tid_il_ref_pics_plus1[1] equal to 0 specifies that inter-layer prediction is not used by non-IRAP pictures of the i-th layer. Max_tid_il_ref_pics_plus1[I] greater than 0 specifies that, for decoding pictures of the i-th layer, no picture with TemporalId greater than max_tid_il_ref_pics_plus1[I]−1 is used as ILRP. When not present, the value of max_tid_il_ref_pics_plus1[I] is inferred to be equal to 7.

Each_layer_is_an_ols_flag equal to 1 specifies that each OLS contains only one layer and each layer itself in a CVS referring to the VPS is an OLS with the single included layer being the only output layer. Each_layer_is_an_ols_flag equal to 0 that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

Ols_mode_idc equal to 0 specifies that the total number of OLSs specified by the VPS is equal to vps_max_layers_minus1+1, the i-th OLS includes the layers with layer indices from 0 to I, inclusive, and for each OLS only the highest layer in the OLS is output.

Ols_mode_idc equal to 1 specifies that the total number of OLSs specified by the VPS is equal to vps_max_layers_minus1+1, the i-th OLS includes the layers with layer indices from 0 to I, inclusive, and for each OLS all layers in the OLS are output.

Ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc shall be in the range of 0 to 2, inclusive. The value 3 of ols_mode_idc is reserved for future use by ITU-T ISO/IEC.

When vps_all_independent_layers_flag is equal to 1 and each_layer_is_an_ols_flag is equal to 0, the value of ols_mode_idc is inferred to be equal to 2.

Num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if(vps_max_layers_minus1==0)

TotalNumOlss=1

else
    if(each_layer_is_an_ols_flag||ols_mode_idc==0||ols_
    mode_idc==1)

TotalNumOlss=vps_max_layers_minus1+1

else if(ols_mode_idc==2)

TotalNumOlss=num_output_layer_sets_minus1+1                (39)
```

ols_output_layer_flag[I][j] equal to 1 specifies that the layer with nuh_layer_id equal to vps_layer_id[j] is an output layer of the i-th OLS when ols_mode_idc is equal to 2.

Ols_output_layer_flag[I][j] equal to 0 specifies that the layer with nuh_layer_id equal to vps_layer_id[j] is not an output layer of the i-th OLS when ols_mode_idc is equal to 2.

The variable NumOutputLayersInOls[I], specifying the number of output layers in the i-th OLS, the variable NumSubLayersInLayerInOLS[I][j], specifying the number of sublayers in the j-th layer in the i-th OLS, the variable OutputLayerIdInOls[I][j], specifying the nuh_layer_id value of the j-th output layer in the i-th OLS, and the variable LayerUsedAsOutputLayerFlag[k], specifying whether the k-th layer is used as an output layer in at least one OLS, are derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( I = 1, I <= vps_max_layers_minus1; i++ ) {
  if( each_layer_is_an_ols_flag | | ols_mode_idc < 2 )
    LayerUsedAsOutputLayerFlag[ I ] = 1
  else /*( !each_layer_is_an_ols_flag && ols_mode_idc = = 2 ) */
    LayerUsedAsOutputLayerFlag[ I ] = 0
  }
  for( I = 1; I < TotalNumOlss; i++ )
    if( each_layer_is_an_ols_flag | | ols_mode_idc = = 0 ) {
      NumOutputLayersInOls[ I ] = 1
      OutputLayerIdInOls[ I ][ 0 ] = vps_layer_id[ I ]
      for(j = 0; j < I && ( ols_mode_idc = = 0 ); j++ )
        NumSubLayersInLayerInOLS[ I ][ j ] = max_tid_il_ref_pics_plus1[ I ]
      NumSubLayersInLayerInOLS[ I ][ I ] = vps_max_sub_layers_minus1 + 1
    } else if( ols_mode_idc = = 1 ) {
      NumOutputLayersInOls[ I ] = I + 1
      for( j = 0; j < NumOutputLayersInOls[ I ]; j++ ) {
        OutputLayerIdInOls[ I ][ j ] = vps_layer_id[ j ]
        NumSubLayersInLayerInOLS[ I ][ j ] = vps_max_sub_layers_minus1 + 1
    }
  } else if( ols_mode_idc = = 2 ) {
    for( j = 0; j <= vps_max_layers_minus1; j++ ) {
      layerIncludedInOlsFlag[ I ][ j ] = 0
      NumSubLayersInLayerInOLS[ I ][ j ] = 0
    }
    for( k = 0, j = 0; k <= vps_max_layers_minus1; k++ ) (40 )
      if( ols_output_layer_flag[ I ][ k ] ) {
        layerIncludedInOlsFlag[ I ][ k ] = 1
        LayerUsedAsOutputLayerFlag[ k ] = 1
        OutputLayerIdx[ I ][ j ] = k
        OutputLayerIdInOls[ I ][ j++ ] = vps_layer_id[ k ]
        NumSubLayersInLayerInOLS [ I ][ j ] =
vps_max_sub_layers_minus1 + 1
      }
    NumOutputLayersInOls[ I ] = j
    for( j = 0; j < NumOutputLayersInOls[ I ]; j++ ) {
    idx = OutputLayerIdx[ I ][ j ]
    for( k = 0; k < NumRefLayers[ idx ]; k++ ) {
      layerIncludedInOlsFlag[ I ][ RefLayerIdx[ idx ][ k ] ] = 1
        if( NumSubLayersInLayerInOLS[ I ][ RefLayerIdx[ idx ][ k ] ] <
  max_tid_il_ref_pics_plus1[ OutputLayerIdInOls[ I ][ j ] ] )
          NumSubLayersInLayerInOLS[ I ][ RefLayerIdx[ idx ][ k ] ] =
  max_tid_il_ref_pics_plus1[ OutputLayerIdInOls[ I ][ j ] ]
      }
    }
  }
```

For each value of I in the range of 0 to vps_max_layers_minus1, inclusive, the values of LayerUsedAsRefLayerFlag[I] and LayerUsedAsOutputLayerFlag[I] shall not be both equal to 0. In other words, there shall be no layer that is neither an output layer of at least one OLS nor a direct reference layer of any other layer.

For each OLS, there shall be at least one layer that is an output layer. In other words, for any value of I in the range of 0 to TotalNumOlss−1, inclusive, the value of NumOutputLayersInOls[I] shall be greater than or equal to 1.

The variable NumLayersInOls[I], specifying the number of layers in the i-th OLS, and the variable LayerIdInOls[I][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( I = 1; I < TotalNumOlss; i++ ) {
  if( each_layer_is_an_ols_flag ) {
    NumLayersInOls[ I ] = 1
    LayerIdInOls[ I ][ 0 ] = vps_layer_id[ I ]       (41)
  } else if( ols_mode_idc == 0 | | ols_mode_idc = = 1 ) {
  NumLayersInOls[ I ] = I + 1
```

-continued

```
  for( j = 0; j < NumLayersInOls[ I ]; j++ )
      LayerIdInOls[ I ][ j ] = vps_layer_id[ j ]
  } else if( ols_mode_idc = = 2 ) {
  for( k = 0, j = 0; k <= vps_max_layers_minus1; k++ )
        if( layerIncludedInOlsFlag[ I ][ k ] )
          LayerIdInOls[ I ][ j++ ] = vps_layer_id[ k ]
      NumLayersInOls[ I ] = j
      }
    }
```

NOTE 1 - The 0-th OLS contains only the lowest layer (i.e., the layer with nuh_layer_id equal to vps_layer_id[ 0 ]) and for the 0-th OLS the only included layer is output.

The variable OlsLayerIdx[ I ][ j ], specifying the OLS layer index of the layer with nuh_layer_id equal to LayerIdInOls[ I ][ j ], is derived as follows:

```
    for( I = 0; I < TotalNumOlss; i++ )
    for j = 0; j < NumLayersInOls[ I ]; j++ )       42)
      OlsLayerIdx[ I ][ LayerIdInOls[ I ][ j ] ] = j
```

The lowest layer in each OLS shall be an independent layer. In other words, for each I in the range of 0 to TotalNumOlss−1, inclusive, the value of vps_independent_layer_flag[GeneralLayerIdx[LayerIdInOls[I][0]]] shall be equal to 1.

Each layer shall be included in at least one OLS specified by the VPS. In other words, for each layer with a particular value of nuh_layer_id nuhLayerId equal to one of vps_layer_id[k] for k in the range of 0 to vps_max_layers_minus1, inclusive, there shall be at least one pair of values of I and j, where I is in the range of 0 to TotalNumOlss−1, inclusive, and j is in the range of NumLayersInOls[I]−1, inclusive, such that the value of LayerIdInOls[I][j] is equal to nuhLayerId.

Vps_num_ptls_minus1 plus 1 specifies the number of profile_tier_level( ) syntax structures in the VPS. The value of vps_num_ptls_minus1 shall be less than TotalNumOlss.

Pt_present_flag[I] equal to 1 specifies that profile, tier, and general constraints information are present in the i-th profile_tier_level( ) syntax structure in the VPS. Pt_present_flag[I] equal to 0 specifies that profile, tier, and general constraints information are not present in the i-th profile_tier_level( ) syntax structure in the VPS. The value of pt_present_flag[0] is inferred to be equal to 1. When pt_present_flag[I] is equal to 0, the profile, tier, and general constraints information for the i-th profile_tier_level( ) syntax structure in the VPS are inferred to be the same as that for the (I−1)-th profile_tier_level( ) syntax structure in the VPS.

Ptl_max_temporal_id[I] specifies the TemporalId of the highest sublayer representation for which the level information is present in the i-th profile_tier_level( ) syntax structure in the VPS. The value of ptl_max_temporal_id[I] shall be in the range of 0 to vps_max_sublayers_minus1, inclusive. When vps_max_sublayers_minus1 is equal to 0, the value of ptl_max_temporal_id[I] is inferred to be equal to 0. When vps_max_sublayers_minus1 is greater than 0 and vps_all_layers_same_num_sublayers_flag is equal to 1, the value of ptl_max_temporal_id[I] is inferred to be equal to vps_max_sublayers_minus1.

Vps_ptl_alignment_zero_bit shall be equal to 0.

Ols_ptl_idx[I] specifies the index, to the list of profile_tier_level( ) syntax structures in the VPS, of the profile_tier_level( ) syntax structure that applies to the i-th OLS. When present, the value of ols_ptl_idx[I] shall be in the range of 0 to vps_num_ptls_minus1, inclusive. When vps_num_ptls_minus1 is equal to 0, the value of ols_ptl_idx [I] is inferred to be equal to 0.

When NumLayersInOls[I] is equal to 1, the profile_tier_level( ) syntax structure that applies to the i-th OLS is also present in the SPS referred to by the layer in the i-th OLS. It is a requirement of bitstream conformance that, when NumLayersInOls[I] is equal to 1, the profile_tier_level( ) syntax structures signalled in the VPS and in the SPS for the i-th OLS shall be identical.

Vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

Vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

Dpb_max_temporal_id[I] specifies the TemporalId of the highest sublayer representation for which the DPB parameters may be present in the i-th dpb_parameters( ) syntax structure in the VPS. The value of dpb_max_temporal_id[I] shall be in the range of 0 to vps_max_sublayers_minus1, inclusive. When vps_max_sublayers_minus1 is equal to 0, the value of dpb_max_temporal_id[I] is inferred to be equal to 0. When vps_max_sublayers_minus1 is greater than 0 and vps_all_layers_same_num_sublayers_flag is equal to 1, the value of dpb_max_temporal_id[I] is inferred to be equal to vps_max_sublayers_minus1.

Ols_dpb_pic_width[I] specifies the width, in units of luma samples, of each picture storage buffer for the i-th OLS.

Ols_dpb_pic_height[I] specifies the height, in units of luma samples, of each picture storage buffer for the i-th OLS.

Ols_dpb_params_idx[I] specifies the index, to the list of dpb_parameters( ) syntax structures in the VPS, of the dpb_parameters( ) syntax structure that applies to the i-th OLS when NumLayersInOls[I] is greater than 1. When present, the value of ols_dpb_params_idx[I] shall be in the range of 0 to vps_num_dpb_params−1, inclusive. When ols_dpb¯params_idx[I] is not present, the value of ols_dpb_params_idx[I] is inferred to be equal to 0.

When NumLayersInOls[I] is equal to 1, the dpb_parameters( ) syntax structure that applies to the i-th OLS is present in the SPS referred to by the layer in the i-th OLS.

Vps_general_hrd_params_present_flag equal to 1 specifies that the VPS contains a general_hrd_parameters( ) syntax structure and other HRD parameters.

Vps_general_hrdparamspresent_flag equal to 0 specifies that the VPS does not contain a general_hrd_parameters( ) syntax structure or other HRD parameters. When not present, the value of vps_general_hrd_params_present_flag is inferred to be equal to 0.

When NumLayersInOls[I] is equal to 1, the general_hrd_parameters( ) syntax structure and the ols_hrd_parameters( ) syntax structure that apply to the i-th OLS are present in the SPS referred to by the layer in the i-th OLS.

Vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[I], inclusive. Vps_sublayer_cpb_params_present_flag equal to 0 specifies that the i-th ols_hrd_parameters( ) syntax structure in the VPS contains HRD parameters for the sublayer representation with TemporalId equal to hrd_max_tid[I] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[I]−1, inclusive, are inferred to be the same as that for the sublayer representation with TemporalId equal to hrd_max_tid[I]. These include the HRD parameters starting from the fixed_pic_rate_general_flag[I] syntax element till the sublayer_hrd_parameters(I) syntax structure immediately under the condition "if(general_vcl_hrd_params_present_flag)" in the ols_hrd_parameters syntax structure.

Num_ols_hrd_params_minus1 plus 1 specifies the number of ols_hrd_parameters( ) syntax structures present in the VPS when vps_general_hrd_params_present_flag is equal to 1. The value of num_ols_hrd_params_minus1 shall be in the range of 0 to TotalNumOlss−1, inclusive.

Hrd_max_tid[I] specifies the TemporalId of the highest sublayer representation for which the HRD parameters are contained in the i-th ols_hrd_parameters( ) syntax structure. The value of hrd_max_tid[I] shall be in the range of 0 to vps_max_sublayers_minus1, inclusive. When vps_max_sublayers_minus1 is equal to 0, the value of hrd_max_tid

[I] is inferred to be equal to 0. When vps_max_sublayers_minus1 is greater than 0 and vps_all_layers_same_num_sublayers_flag is equal to 1, the value of hrd_max_tid[I] is inferred to be equal to vps_max_sublayers_minus1.

Ols_hrd_idx[I] specifies the index, to the list of ols_hrd_parameters( ) syntax structures in the VPS, of the ols_hrd_parameters( ) syntax structure that applies to the i-th OLS when NumLayersInOls[I] is greater than 1. The value of ols_hrd_idx[[I] shall be in the range of 0 to num_ols_hrd_params_minus1, inclusive.

When NumLayersInOls[I] is equal to 1, the ols_hrd_parameters( ) syntax structure that applies to the i-th OLS is present in the SPS referred to by the layer in the i-th OLS.

If the value of num_ols_hrd_param_minus1+1 is equal to TotalNumOlss, the value of ols_hrd_idx[I] is inferred to be equal to i. Otherwise, when NumLayersInOls[I] is greater than 1 and num_ols_hrd_params_minus1 is equal to 0, the value of ols_hrd_idx[[I] is inferred to be equal to 0.

Vps_extension_flag equal to 0 specifies that no vps_extension_data_flag syntax elements are present in the VPS RBSP syntax structure. Vps_extension_flag equal to 1 specifies that there are vps_extension_data_flag syntax elements present in the VPS RBSP syntax structure.

Vps_extension_data_flag may have any value. Its presence and value do not affect decoder conformance to profiles specified in this version of this Specification. Decoders conforming to this version of this Specification shall ignore all vps_extension_data_flag syntax elements.

3.6. Access Unit Delimiter (AUD) Syntax and Semantics in VVC

In the latest VVC text (in JVET-Q2001-Ve/v15), the AUD syntax and semantics are as follows.

7.3.2.9 AU delimiter RBSP syntax

| | Descriptor |
|---|---|
| access_unit_delimiter_rbsp( ) { | |
| pic_type | u(3) |
| rbsp_trailing_bits( ) | |
| } | |

7.4.3.9 AU Delimiter RBSP Semantics

The AU delimiter is used to indicate the start of an AU and the type of slices present in the coded pictures in the AU containing the AU delimiter NAL unit. There is no normative decoding process associated with the AU delimiter.

Pic_type indicates that the slice type values for all slices of the coded pictures in the AU containing the AU delimiter NAL unit are members of the set listed in Table 7 for the given value of pic_type. The value of pic_type shall be equal to 0, 1 or 2 in bitstreams conforming to this version of this Specification. Other values of pic_type are reserved for future use by ITU-T|ISO/IEC. Decoders conforming to this version of this Specification shall ignore reserved values of pic_type.

TABLE 7

Interpretation of pic_type

| pic_type | slice_type values that may be present in the AU |
|---|---|
| 0 | I |
| 1 | P, I |
| 2 | B, P, I |

3.7. Order of AUs and PUs

In the latest VVC text (in JVET-Q2001-Ve/v15), the specification of the decoding order of AUs and PUs is as follows.

7.4.2.4.2 Order of AUs and their Association to CVSs

A bitstream consists of one or more CVSs.

A CVS consists of one or more AUs. The order of PUs and their association to AUs are described in clause 7.4.2.4.3.

The first AU of a CVS is a CVSS AU, wherein each present PU is a CLVSS PU, which is either an IRAP PU with NoOutputBeforeRecoveryFlag equal to 1 or a GDR PU with NoOutputBeforeRecoveryFlag equal to 1.

Each CVSS AU shall have a PU for each of the layers present in the CVS.

7.4.2.4.3 Order of PUs and their Association to AUs

An AU consists of one or more PUs in increasing order of nuh_layer_id. The order NAL units and coded pictures and their association to PUs are described in clause 7.4.2.4.4.

There can be at most one AUD NAL unit in an AU. When an AUD NAL unit is present in an AU, it shall be the first NAL unit of the AU, and consequently, it is the first NAL unit of the first PU of the AU.

There can be at most one EOB NAL unit in an AU. When an EOB NAL unit is present in an AU, it shall be the last NAL unit of the AU, and consequently, it is the last NAL unit of the last PU of the AU.

A VCL NAL unit is the first VCL NAL unit of an AU (and consequently the PU containing the VCL NAL unit is the first PU of the AU) when the VCL NAL unit is the first VCL NAL unit that follows a PH NAL unit and one or more of the following conditions are true:—

The value of nuh_layer_id of the VCL NAL unit is less than the nuh_layer_id of the previous picture in decoding order.

The value of ph_pic_order_cnt_lsb of the VCL NAL unit differs from the ph_pic_order_cnt_lsb of the previous picture in decoding order.

PicOrderCntVal derived for the VCL NAL unit differs from the PicOrderCntVal of the previous picture in decoding order.

Let firstVclNalUnitInAu be the first VCL NAL unit of an AU. The first of any of the following NAL units preceding firstVclNalUnitInAu and succeeding the last VCL NAL unit preceding firstVclNalUnitInAu, if any, specifies the start of a new AU:—

AUD NAL unit (when present),
DCI NAL unit (when present),
VPS NAL unit (when present),
SPS NAL unit (when present),
PPS NAL unit (when present),
Prefix APS NAL unit (when present),
PH NAL unit (when present),
Prefix SEI NAL unit (when present),
NAL unit with nal_unit_type equal to RSV_NVCL_26 (when present), NAL unit with nal_unit_type in the range of UNSPEC28 . . . UNSPEC29 (when present).

NOTE—The first NAL unit preceding firstVclNalUnitInAu and succeeding the last VCL NAL unit preceding firstVclNalUnitInAu, if any, can only be one of the above-listed NAL units.

It is a requirement of bitstream conformance that, when present, the next PU of a particular layer after a PU that belongs to the same layer and contains an EOS NAL unit shall be a CLVSS PU, which is either an IRAP PU with NoOutputBeforeRecoveryFlag equal to 1 or a GDR PU with NoOutputBeforeRecoveryFlag equal to 1.

4. Examples of Technical Problems Solved by Disclosed Technical Solutions

The existing scalability design in the latest VVC text (in JVET-Q2001-Ve/v15) has the following problems:

1) A CVSS AU, which starts a new CVS, is required to be complete (i.e., to have a picture for each of the layers present in the CVS). However, according to the current design, the decoder is not able to check whether an AU includes a picture "for each of the layers present in the CVS" before the decoder receives the last picture of the CVS, while on the other hand, even the last picture of the CVS is not easy to be determined because the last picture is not easy to determine the start of any of CVS except for the very first CVS of the bitstream. Basically, that means, the decoder can only figure out the boundaries of CVSs after receiving the entire bitstream.
2) Currently, an TRAP AU may start a new CVS and is required to be complete (i.e., to have a picture for each of the layers present in the CVS), while a GDR AU may also start a new CVS but is NOT required to be complete. This basically disables random accessing a bitstream starting from a GDR AU that is not complete in a conforming manner, because usually the starting AU in random accessing would become a CVSS AU but when such a GDR AU is incomplete it cannot be a CVSS AU.

5. Example Embodiments and Techniques

To solve the above problems, and others, methods as summarized below are disclosed. The embodiments should be considered as examples to explain the general concepts and should not be interpreted in a narrow way. Furthermore, these embodiments can be applied individually or combined in any manner.

Solutions for Solving the First Problem

1) To solve the first problem, an indication of whether an AU is complete, in the sense whether it includes a picture for each of the layers present in the CVS, may be signaled.
   a. In one example, the indication is signaled only for AUs that may start a new CVS.
      i. In one example, furthermore, the indication is signaled only for AUs for which each picture is an TRAP or GDR picture.
   b. In one example, the indication is signaled in the AUD NAL unit.
      i. In one example, the indication is signaled by a flag (e.g., irap_or_gdr_au_flag) in the AUD NAL unit.
         1. Alternatively, additionally, when irap_or_gdr_au_flag is equal to 1, a flag (i.e., named irap_au_flag) may be signaled in the AUD to specify whether the AU is an IRAP AU or a GDR AU (irap_au_flag equal to 1 specifies that the AU is an TRAP AU, and irap_au_flag equal to 0 specifies that the AU is a GDR AU). No value of irap_au_flag is inferred when it is not present.
      ii. In one example, furthermore, one and only one AUD NAL unit is required to be present in each IRAP or GDR AU when vps_max_layers_minus1 is greater than 0.
         1. Alternatively, one and only one AUD NAL unit is required to be present in each IRAP or GDR AU regardless of the value of vps_max_layers_minus1.
      iii. In one example, the flag equal to 1 specifies that all slices in the AU have the same NAL unit type in the range of IDR_W_RADL to GDR_NUT, inclusive. Consequently, if the NAL unit type is IDR_W_RADL or IDR_N_LP and this flag is equal to 1, the AU is a CVSS AU. Otherwise (the NAL unit type is CRA_NUT or GDR_NUT), the AU is a CVSS AU when the variable NoOutputBeforeRecoveryFlag for each of the pictures in the AU is equal to 1.
   c. In one example, furthermore, it is required that each picture in an AU in a CVS shall have nuh_layer_id equal to the nuh_layer_id of one of the pictures present in the first AU of the CVS.
   d. In one example, the indication is signaled in the NAL unit header.
      i. In one example, use a bit in the NAL unit header, e.g., nuh_reserved_zero_bit, to specify whether the AU is complete.
   e. In one example, the indication is signaled in a new NAL unit.
      i. In one example, furthermore, the presence of one and only one of the new NAL unit in each IRAP or GDR AU is required when vps_max_layers_minus1 is greater than 0.
         1. In one example, furthermore, when present in an AU, the new NAL unit shall precede any NAL unit other than the AUD NAL unit, when present, in the AU in decoding order.
         2. Alternatively, the presence of one and only one of the new NAL unit in each IRAP or GDR AU is required regardless of the value of vps_max_layers_minus1.
   f. In one example, the indication is signaled in an SEI message.
      i. In one example, furthermore, the presence of the SEI message in each TRAP or GDR AU is required when vps_max_layers_minus1 is greater than 0.
         1. In one example, furthermore, when present in an AU, the SEI NAL unit containing the SEI message shall precede any NAL unit other than the AUD NAL unit, when present, in the AU in decoding order.
         2. Alternatively, the presence of the SEI message in each TRAP or GDR AU is required regardless of the value of vps_max_layers_minus1.
2) Alternatively, to solve the first problem, an indication of whether an AU starts a new CVS may be signaled.
   a. In one example, the indication is signaled in the AUD NAL unit.

i. In one example, the indication is signaled by a flag (e.g., irap_or_gdr_au_flag) in the AUD NAL unit.

1. Alternatively, additionally, when irap_or_gdr_au_flag is equal to 1, a flag (i.e., named irap_au_flag) may be signaled in the AUD to specify whether the AU is an IRAP AU or a GDR AU (irap_au_flag equal to 1 specifies that the AU is an TRAP AU, and irap_au_flag equal to 0 specifies that the AU is a GDR AU). No value of irap_au_flag is inferred when it is not present.

ii. In one example, furthermore, one and only one AUD NAL unit is required to be present in each CVSS AU when vps_max_layers_minus1 is greater than 0.

1. Alternatively, one and only one AUD NAL unit is required to be present in each CVSS AU regardless of the value of vps_max_layers_minus1.

b. In one example, the indication is signaled in the NAL unit header.

i. In one example, use a bit in the NAL unit header, e.g., nuh_reserved_zero_bit, to specify whether the AU is a CVSS AU.

c. In one example, the indication is signaled in a new NAL unit.

i. In one example, furthermore, the presence of one and only one of the new NAL unit in each CVSS AU is required when vps_max_layers_minus1 is greater than 0.

1. In one example, furthermore, when present in an AU, the new NAL unit shall precede any NAL unit other than the AUD NAL unit, when present, in the AU in decoding order.

2. Alternatively, the presence of one and only one of the new NAL unit in each CVSS AU is required regardless of the value of vps_max_layers_minus1.

ii. In one example, the presence of the new NAL unit in an AU specifies that the AU is a CVSS AU.

1. Alternatively, a flag is included in the new NAL unit to specify whether the AU is a CVSS AU.

d. In one example, the indication is signaled in an SEI message.

i. In one example, furthermore, the presence of the SEI message in each CVSS AU is required when vps_max_layers_minus1 is greater than 0.

1. In one example, furthermore, when present in an AU, the SEI NAL unit containing the SEI message shall precede any NAL unit other than the AUD NAL unit, when present, in the AU in decoding order.

2. Alternatively, the presence of the SEI message in each CVSS AU is required regardless of the value of vps_max_layers_minus1.

3) Alternatively, to solve the first problem, a CVSS AU, which starts a new CVS, is required to have a picture for each of the layers specified by the VPS. Note that a shortcoming of this approach is that then the number of layers signaled in the VPS needs to be precise, and consequently when a layer is removed from the bitstream the VPS needs to be modified.

4) Alternatively, to solve the first problem, when vps_max_layers_minus1 is greater than 0, mandate the presence of the EOS NAL unit for each picture in the last AU of each CVS, and optionally also the presence of the EOB NAL unit in the last AU of each bitstream. Thus each CVSS AU would be identified by either being the first AU in the bitstream or the presence of the EOS NAL units in the previous AU.

5) Alternatively, to solve the first problem, an external-means-determined variable is specified to specify whether an AU is a CVSS AU.

Solutions for Solving the Second Problem

6) To solve the second problem, it is required that each GDR AU is required to be complete (i.e., to have a picture for each of the layers present in the CVS). That means, an AU consisting of GDR pictures but if it is incomplete then it is not a GDR AU, similarly as currently that an AU consisting of TRAP pictures but if it is incomplete then it is not an IRAP AU.

a. In one example, a GDR AU may be defined as an AU in which there is a PU for each layer in the CVS and the coded picture in each present PU is a GDR picture.

6. Embodiments

Below are some example embodiments for some of the disclosed aspects summarized above in Section 5, which can be applied to the VVC specification. The changed texts are based on the latest VVC text in JVET-Q2001-Ve/v15. Most relevant parts that have been added or modified are shown in underline, bolded and italicized text, and the most relevant removed parts are highlighted in enclosed in bolded double brackets, e.g., [[a]] indicates that "a" has been removed. There are some other changes that are editorial in nature and thus not highlighted.

6.1. First Embodiment

This embodiment is for items 1, 1.a, 1.a.i, 1.b, 1.b.i, 1.b.ii, 1.b.iii, 1.c, 6, and 6a.

3 Definitions

. . .

gradual decoding refresh (GDR) AU: An AU in which there is a PU for each layer in the CVS and the coded picture in each present PU is a GDR picture.

. . .

7.3.2.9 AU delimiter RBSP syntax

| | Descriptor |
|---|---|
| access_unit_delimiter_rbsp( ) { | |
| ***irap_or_gdr_au_flag*** | ***u(1)*** |
| pic_type | u(3) |
| rbsp_trailing_bits( ) | |
| } | |

7.4.3.9 AU Delimiter RBSP Semantics

The AU delimiter is used to indicate the start of an AU, whether the AU is an IRAP or GDR AU, and the type of slices present in the coded pictures in the AU containing the AU delimiter NAL unit. For single-layer bitstreams, there is no normative decoding process associated with the AU delimiter.

Irap_or_gdr_au_flag equal to 1 specifies that the AU containing the AU delimiter is an IRAP or GDR AU.

Irap_or_gdr_au_flag equal to 0 specifies that the AU containing the AU delimiter is not an IRAP or GDR AU.

. . .

7.4.2.4.2 Order of AUs and their Association to CVSs

A bitstream consists of one or more CVSs.

A CVS consists of one or more AUs. The order of PUs and their association to AUs are described in clause 7.4.2.4.3.

The first AU of a CVS is a CVSS AU, wherein each present PU is a CLVSS PU, which is either an IRAP PU with NoOutputBeforeRecoveryFlag equal to 1 or a GDR PU with NoOutputBeforeRecoveryFlag equal to 1.

Each CVSS AU shall have a PU for each of the layers present in the CVS and each picture in an AU in a CVS shall have nuh_layer_id equal to the nuh_layer_id of one of the pictures present in the first AU of the CVS.

7.4.2.4.3 Order of PUs and their Association to AUs

An AU consists of one or more PUs in increasing order of nuh_layer_id. The order NAL units and coded pictures and their association to PUs are described in clause 7.4.2.4.4.

There can be at most one AUD NAL unit in an AU, and when vps_max_layers_minus1 is greater than 0, there shall be one and only one AUD NAL unit in each IRAP or GDR AU.

When an AUD NAL unit is present in an AU, it shall be the first NAL unit of the AU, and consequently, it is the first NAL unit of the first PU of the AU.

There can be at most one EOB NAL unit in an AU. When an EOB NAL unit is present in an AU, it shall be the last NAL unit of the AU, and consequently, it is the last NAL unit of the last PU of the AU.

. . . .

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
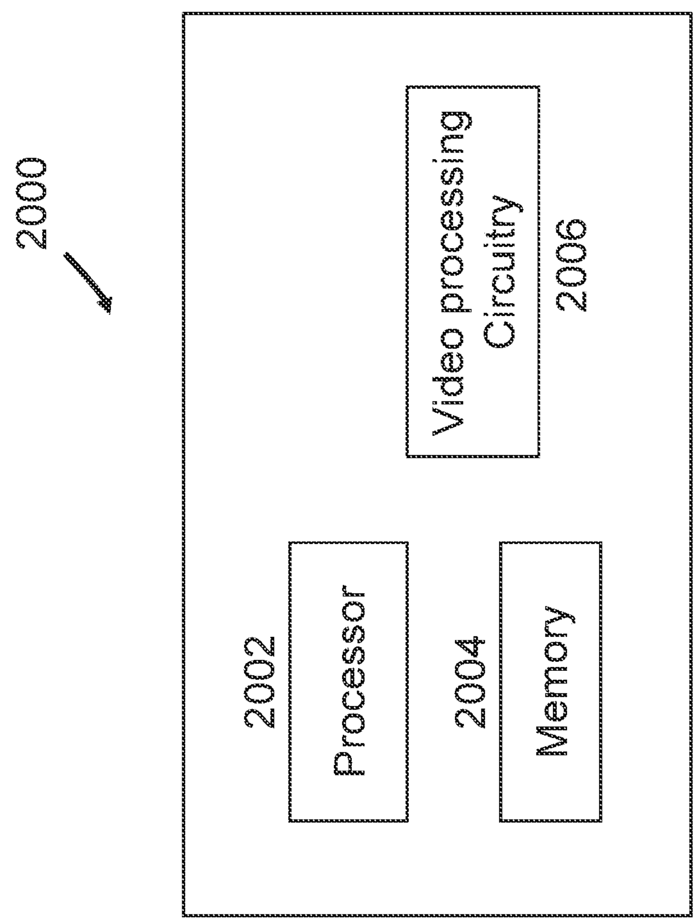
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present document. The memory (memories) 2004 may be used for storing data and code used for implementing the methods and techniques described herein. The video processing hardware 2006 may be used to implement, in hardware circuitry, some techniques described in the present document. In some embodiments, the hardware 2006 may be partly or entirely in the one or more processors 2002, e.g., a graphics processor.

Figure 3:
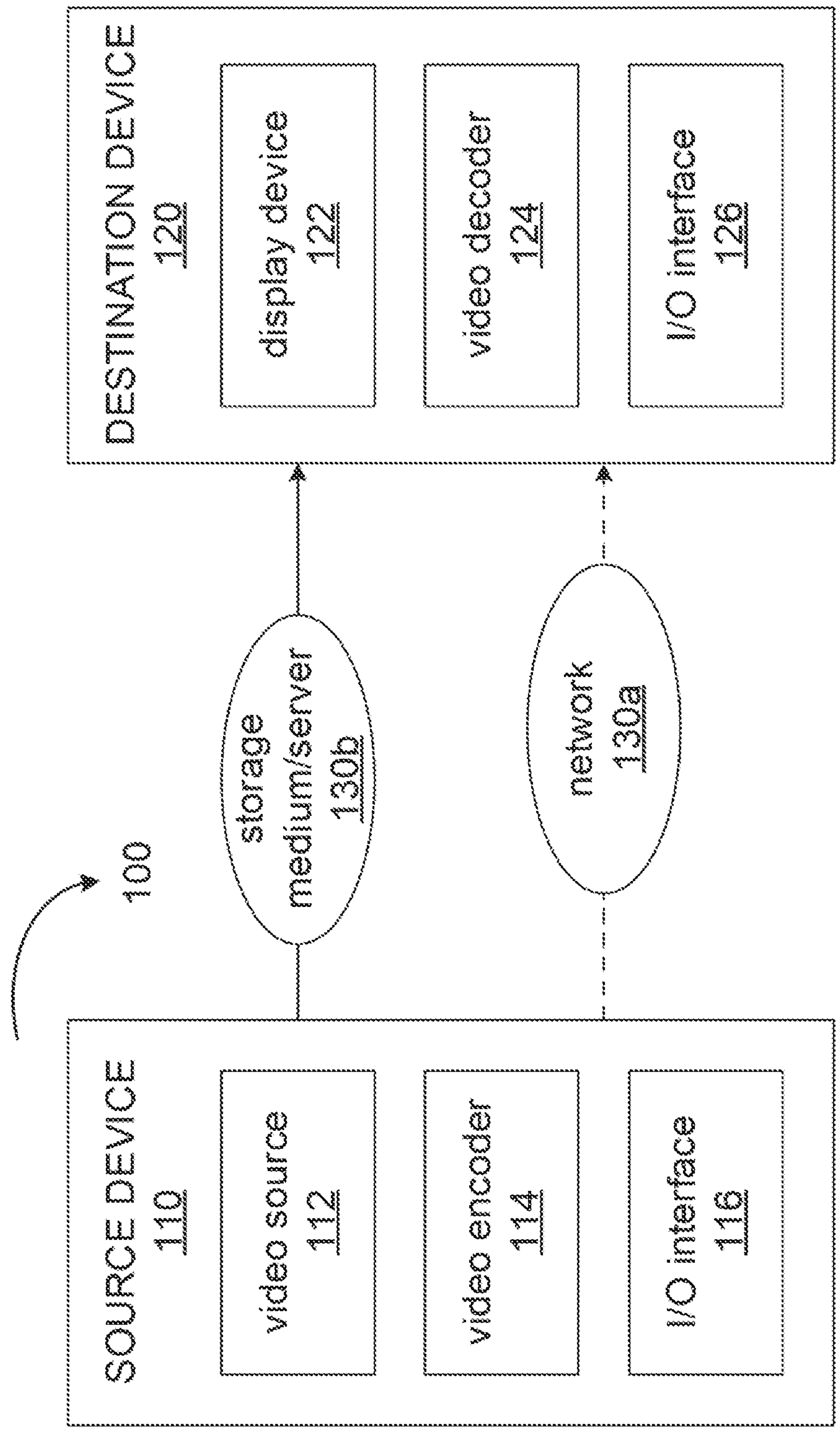
FIG. 3 is a block diagram that illustrates an example video coding system that can implement some embodiments of the present disclosure.

FIG. 3 is a block diagram that illustrates an example video coding system 100 that may utilize the techniques of this disclosure.

As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 4:
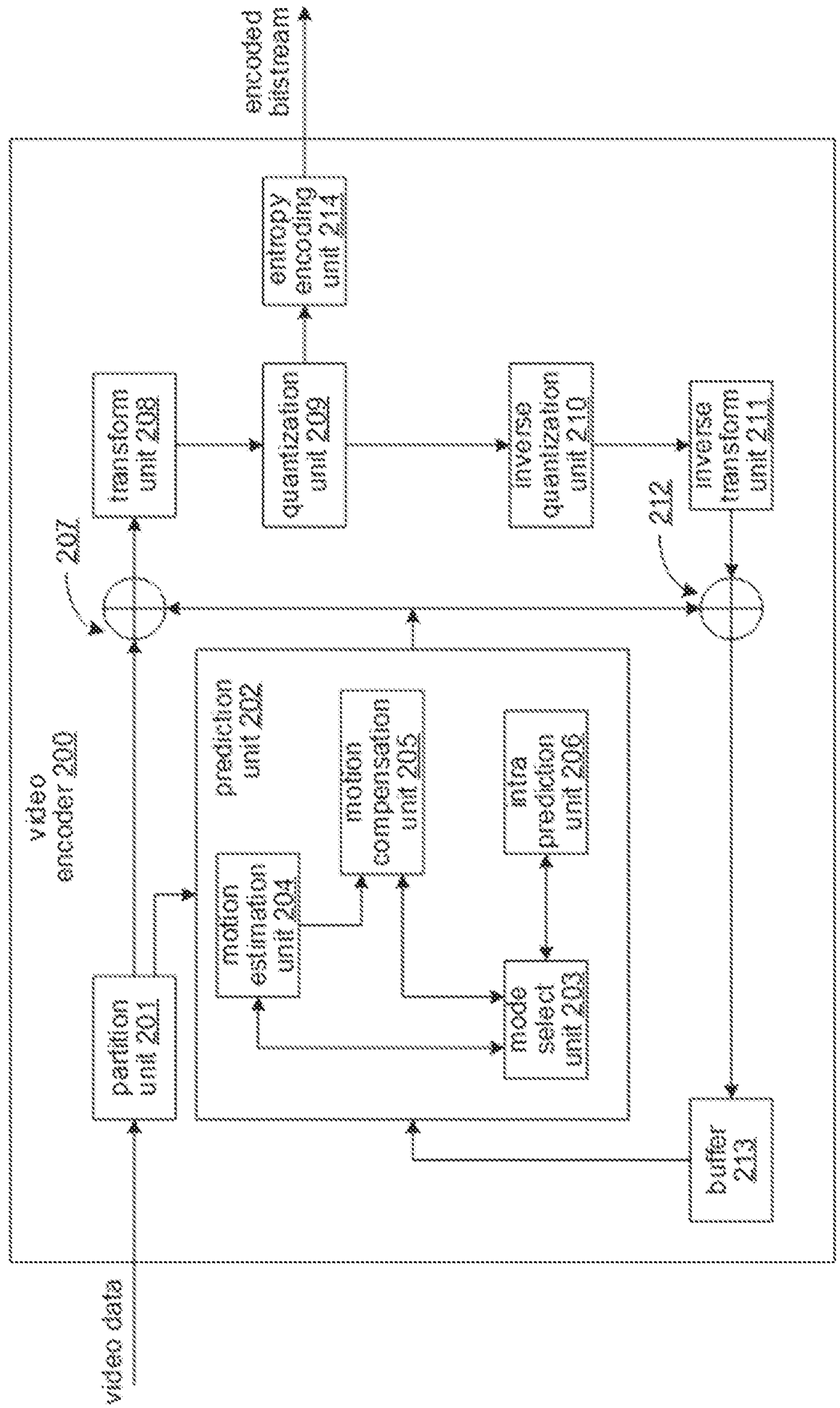
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
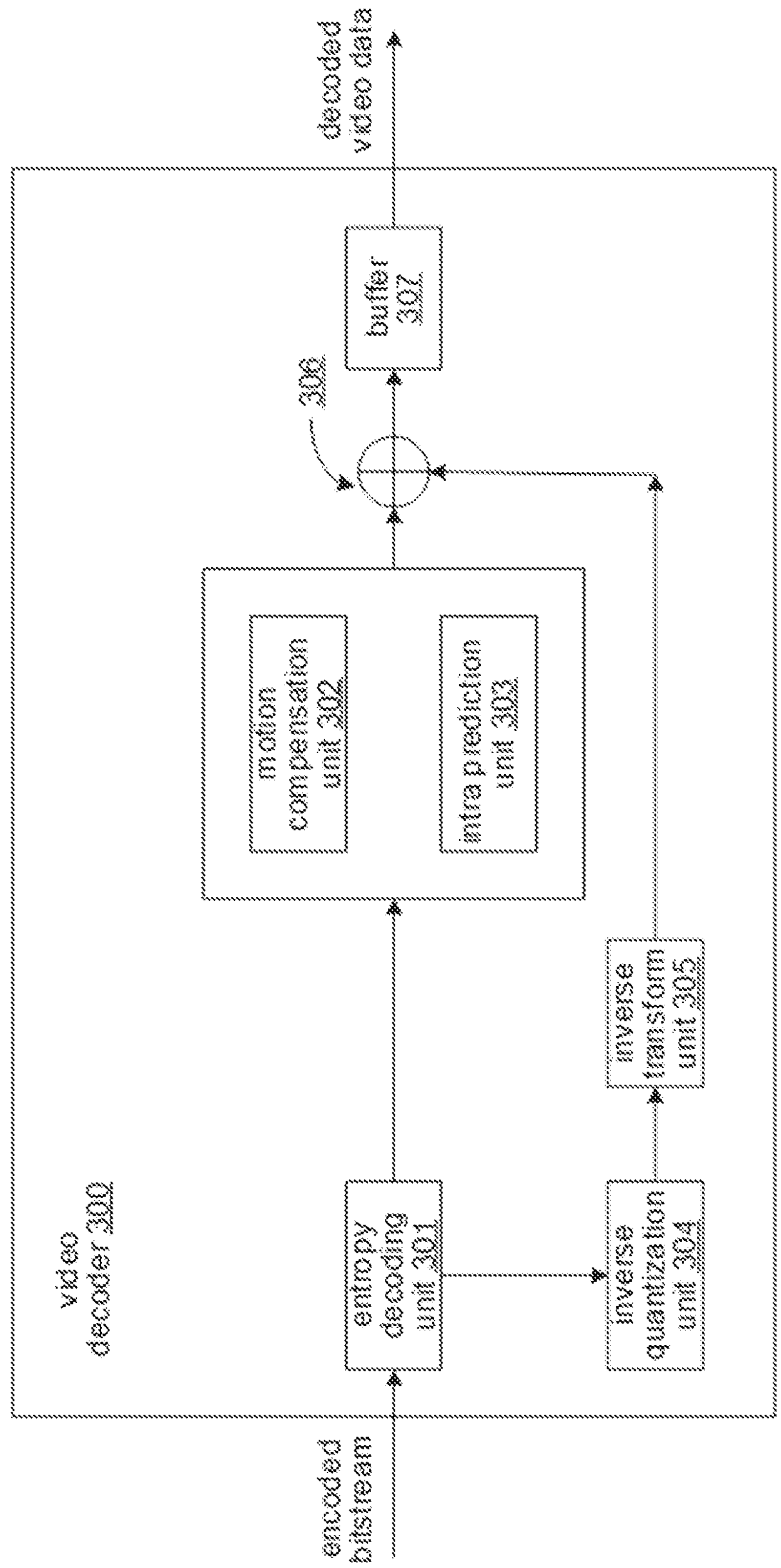
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 6:
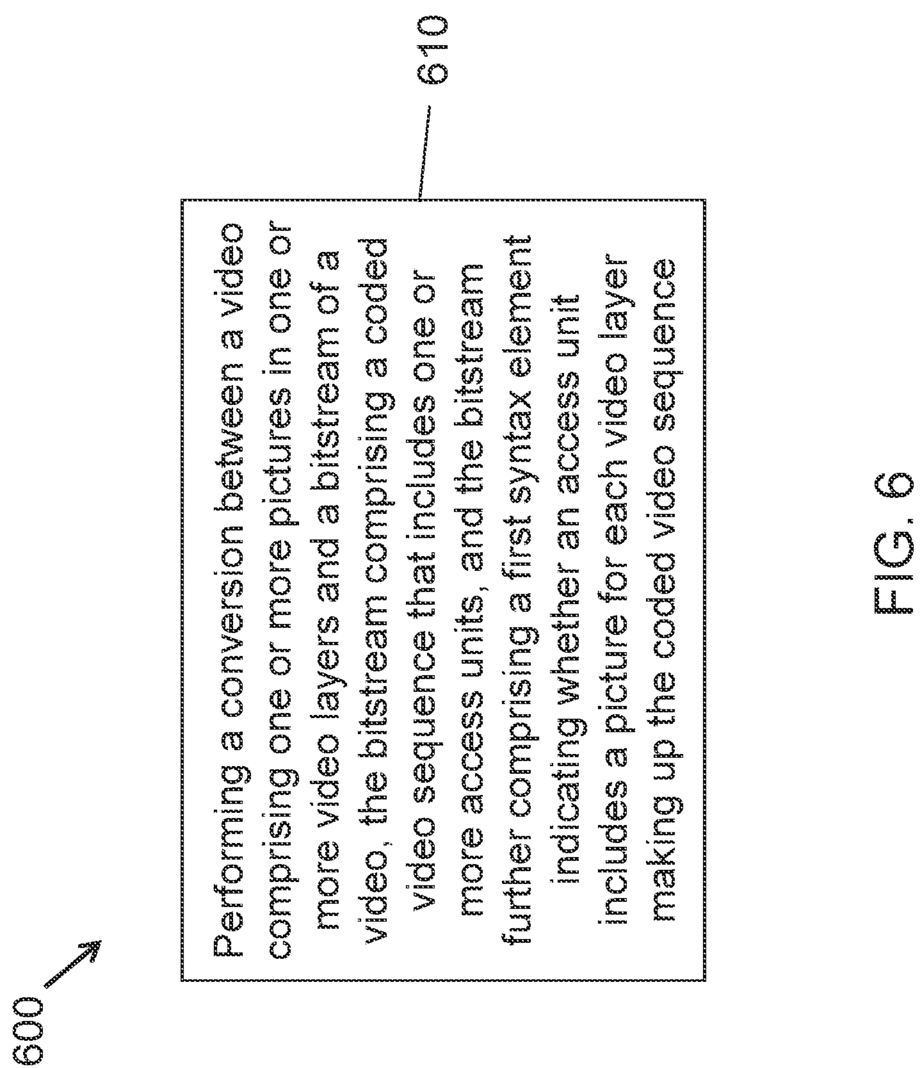
FIGS. 6-13 show flowcharts for example methods of video processing.
Figure 7:
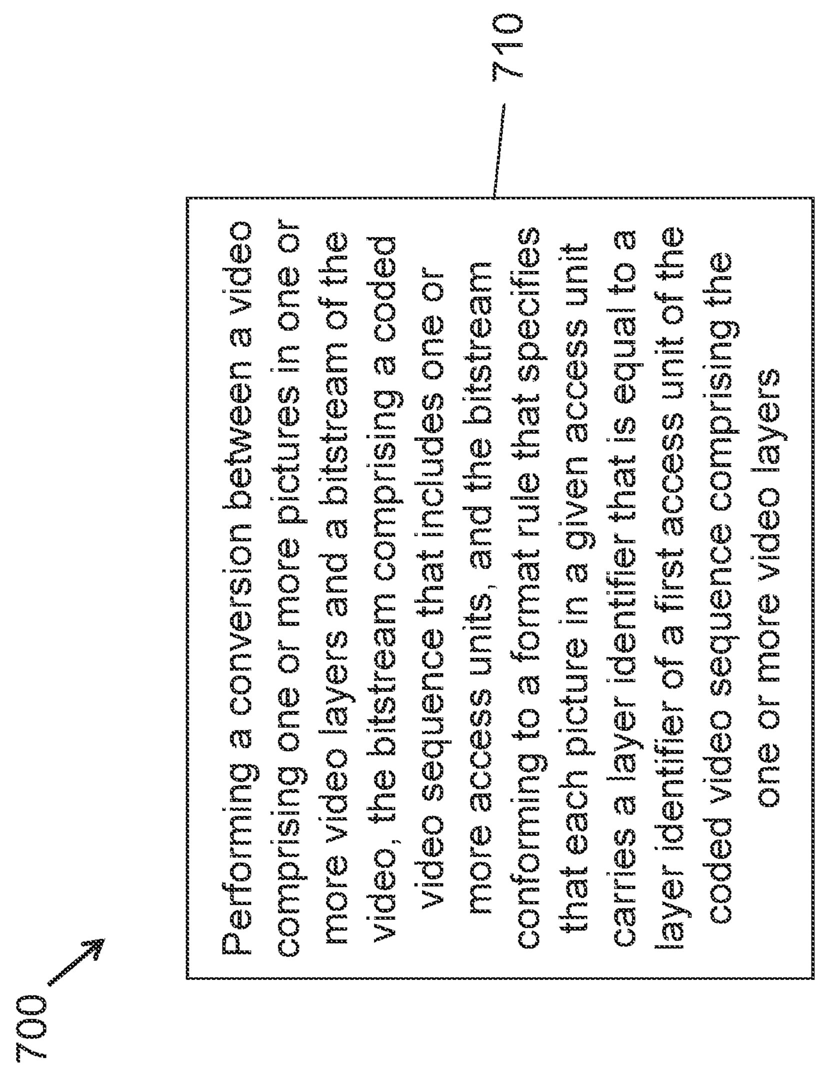

FIGS. 6-7 show example methods that can implement the technical solution described above in, for example, the embodiments shows in FIGS. 1-5.

FIG. 6 shows a flowchart for an example method 600 of video processing. The method 600 includes, at operation 610, performing a conversion between a video comprising one or more pictures in one or more video layers and a bitstream of a video, the bitstream comprising a coded video sequence (CVS) that includes one or more access units (AUs), and the bitstream further comprising a first syntax element indicating whether an AU includes a picture for each video layer making up the CVS.

FIG. 7 shows a flowchart for an example method 700 of video processing. The method 700 includes, at operation 710, performing a conversion between a video comprising one or more pictures in one or more video layers and a bitstream of the video, the bitstream comprising a coded video sequence (CVS) that includes one or more access units (AUs), and the bitstream conforming to a format rule that specifies that each picture in a given AU carries a layer identifier that is equal to a layer identifier of a first AU of the CVS comprising the one or more video layers.

Figure 8:
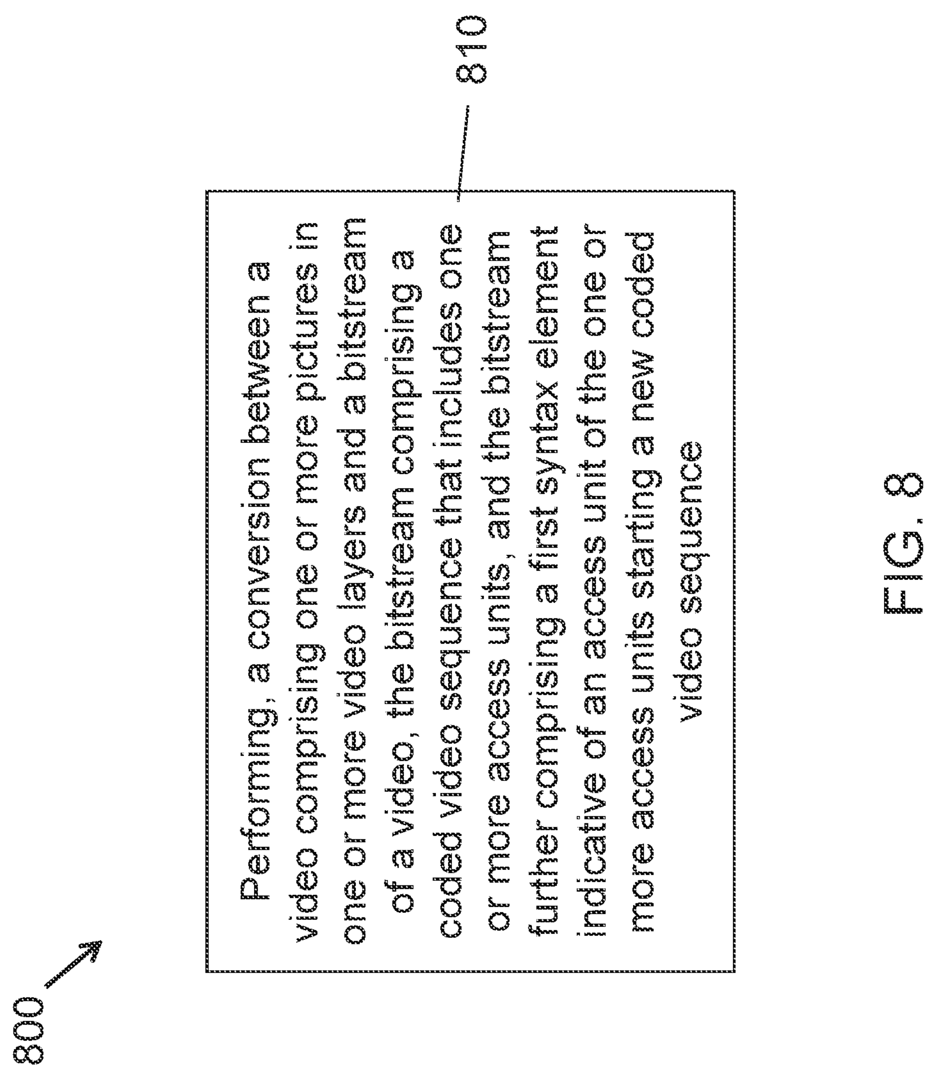

FIG. 8 shows a flowchart for an example method 800 of video processing. The method 800 includes, at operation 810, performing, a conversion between a video comprising one or more pictures in one or more video layers and a bitstream of a video, the bitstream comprising a coded video sequence (CVS) that includes one or more access units (AUs), and the bitstream further comprising a first syntax element indicative of an AU of the one or more AUs starting a new CVS.

Figure 9:
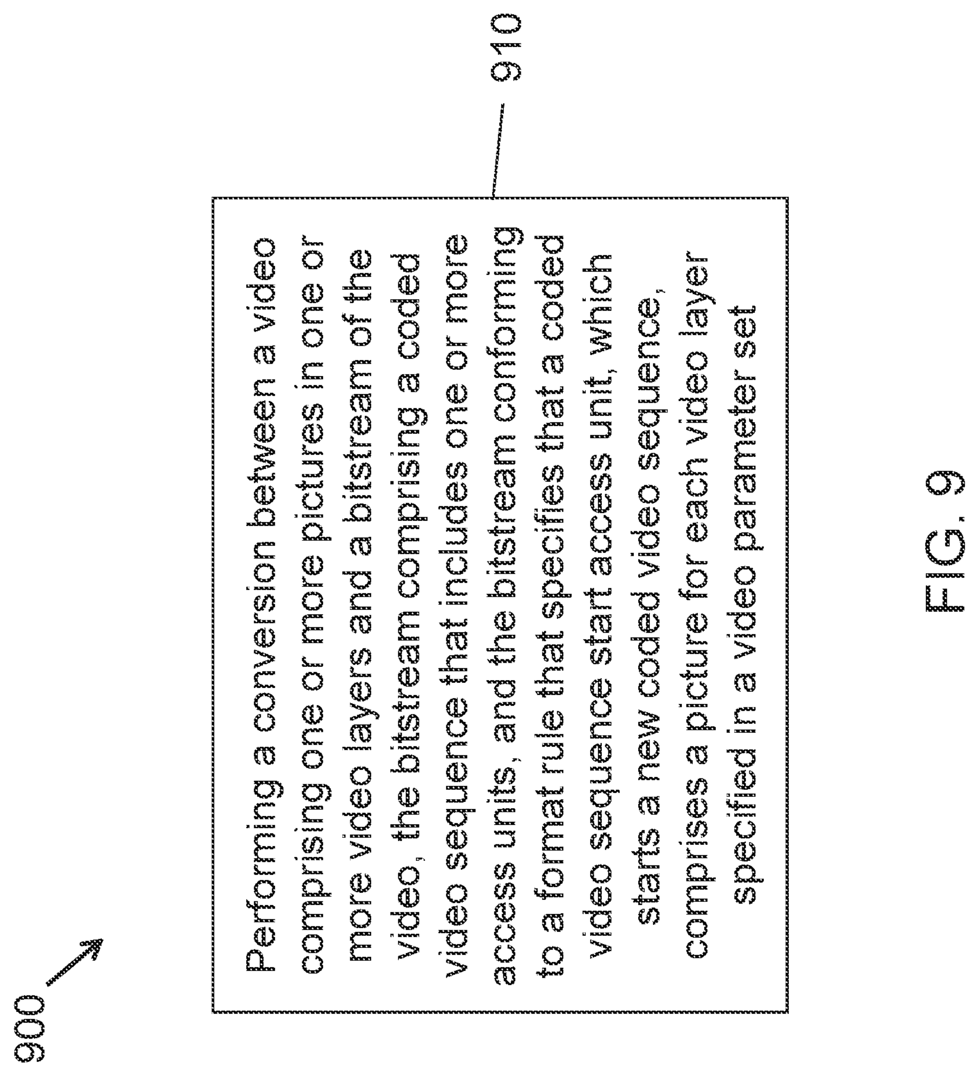

FIG. 9 shows a flowchart for an example method 900 of video processing. The method 900 includes, at operation 910, performing a conversion between a video comprising one or more pictures in one or more video layers and a bitstream of the video, the bitstream comprising a coded video sequence (CVS) that includes one or more access units (AUs), and the bitstream conforming to a format rule that specifies that a coded video sequence start (CVSS) AU, which starts a new CVS, comprises a picture for each video layer specified in a video parameter set (VPS).

Figure 10:
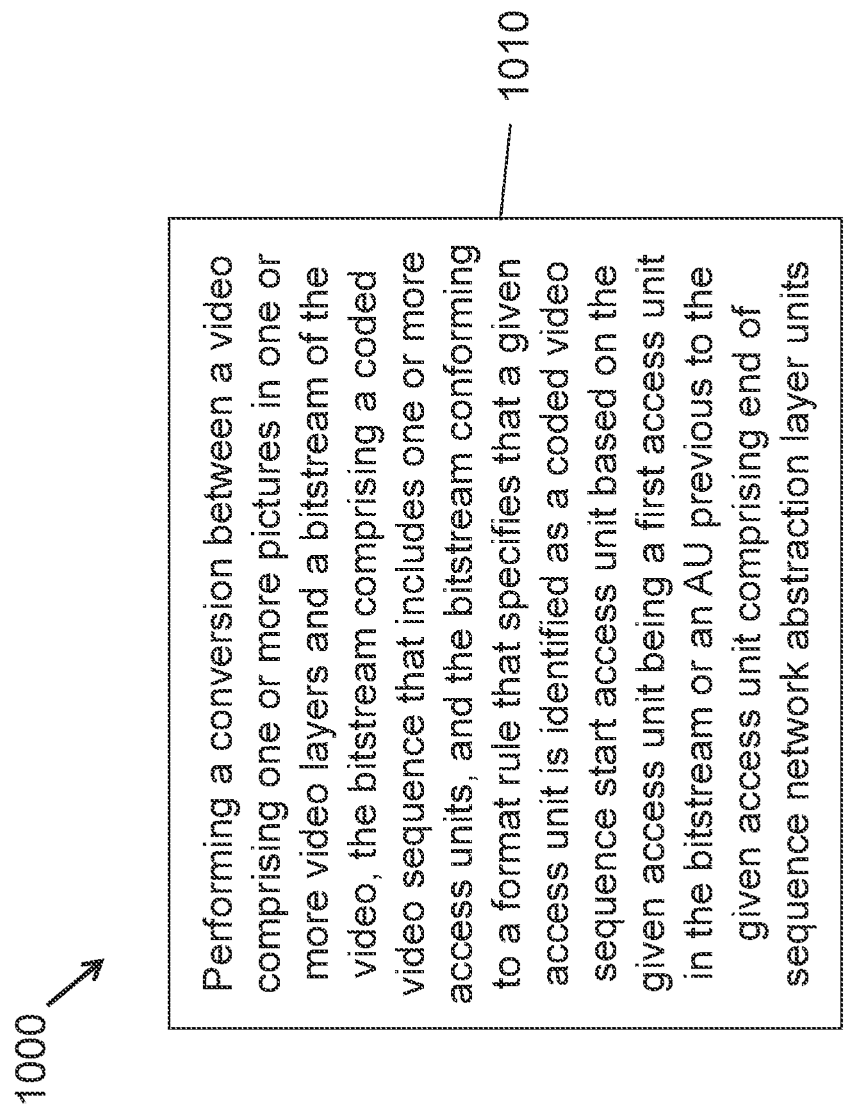

FIG. 10 shows a flowchart for an example method 1000 of video processing. The method 1000 includes, at operation 1010, performing a conversion between a video comprising one or more pictures in one or more video layers and a bitstream of the video, the bitstream comprising a coded video sequence (CVS) that includes one or more access units (AUs), and the bitstream conforming to a format rule that specifies that a given AU is identified as a coded video sequence start (CVSS) AU based on the given AU being a first AU in the bitstream or an AU previous to the given AU comprising end of sequence (EOS) network abstraction layer (NAL) units.

Figure 11:
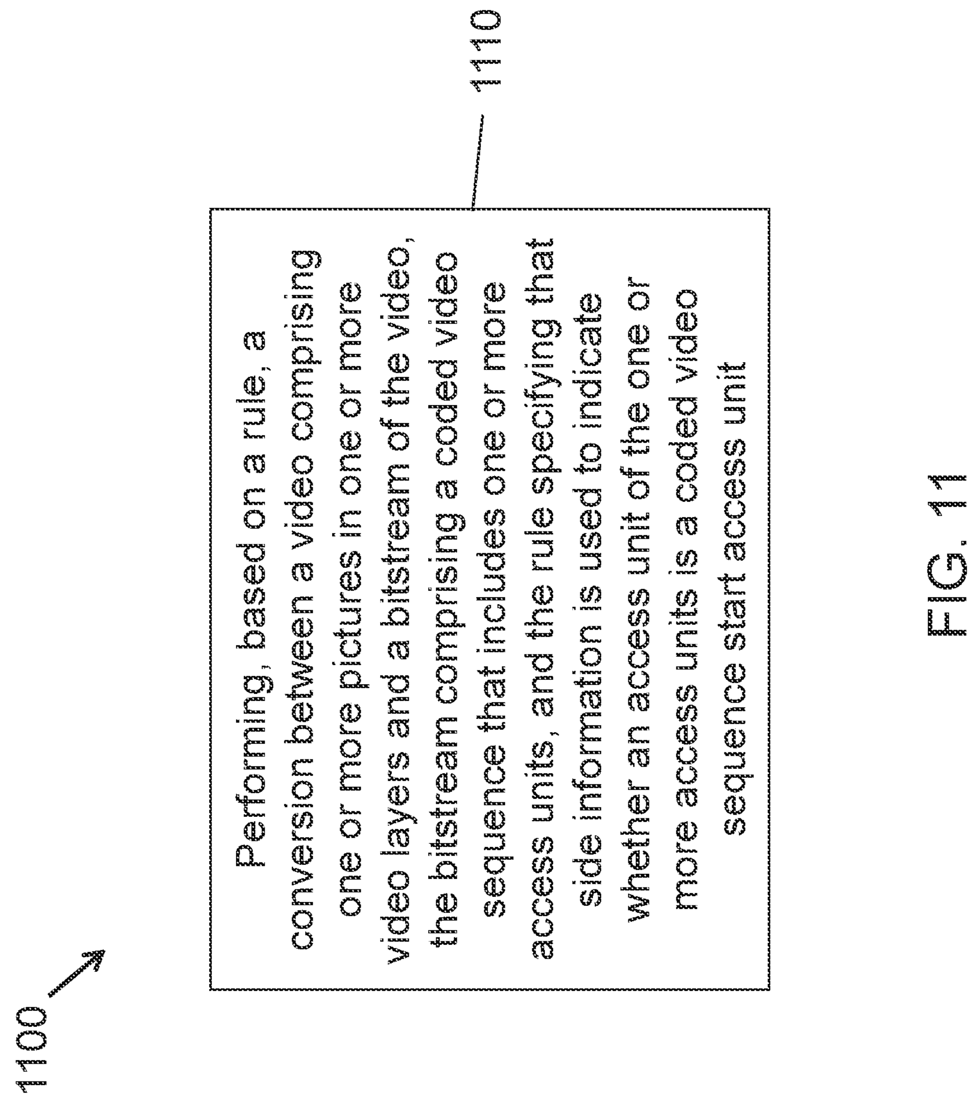

FIG. 11 shows a flowchart for an example method 1100 of video processing. The method 1100 includes, at operation 1110, performing, based on a rule, a conversion between a video comprising one or more pictures in one or more video layers and a bitstream of the video, the bitstream comprising a coded video sequence (CVS) that includes one or more access units (AUs), and the rule specifying that side information is used to indicate whether an AU of the one or more AUs is a coded video sequence start (CVSS) AU.

Figure 12:
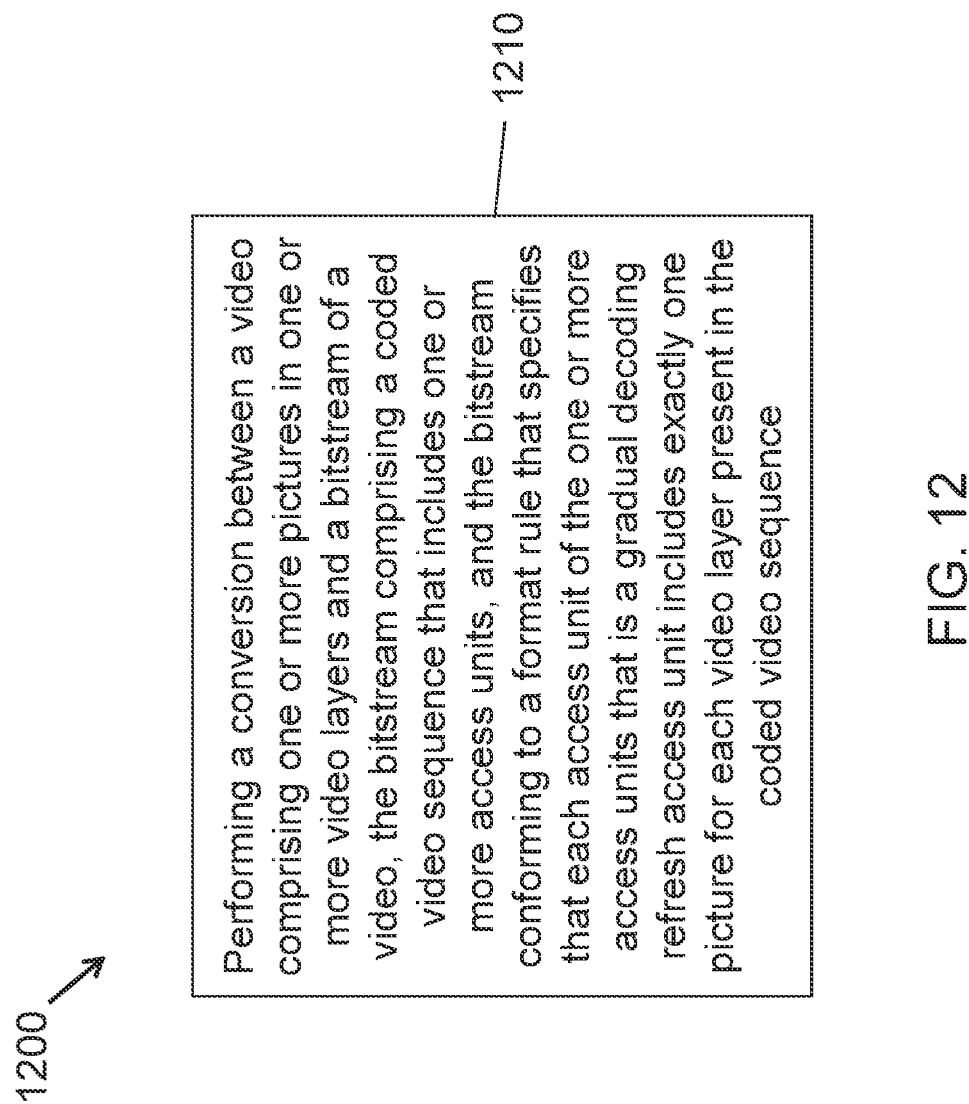

FIG. 12 shows a flowchart for an example method 1200 of video processing. The method 1200 includes, at operation 1210, performing a conversion between a video comprising one or more pictures in one or more video layers and a bitstream of a video, the bitstream comprising a coded video sequence (CVS) that includes one or more access units (AUs), and the bitstream conforming to a format rule that specifies that each AU of the one or more AUs that is a gradual decoding refresh AU includes exactly one picture for each video layer present in the CVS.

Figure 13:
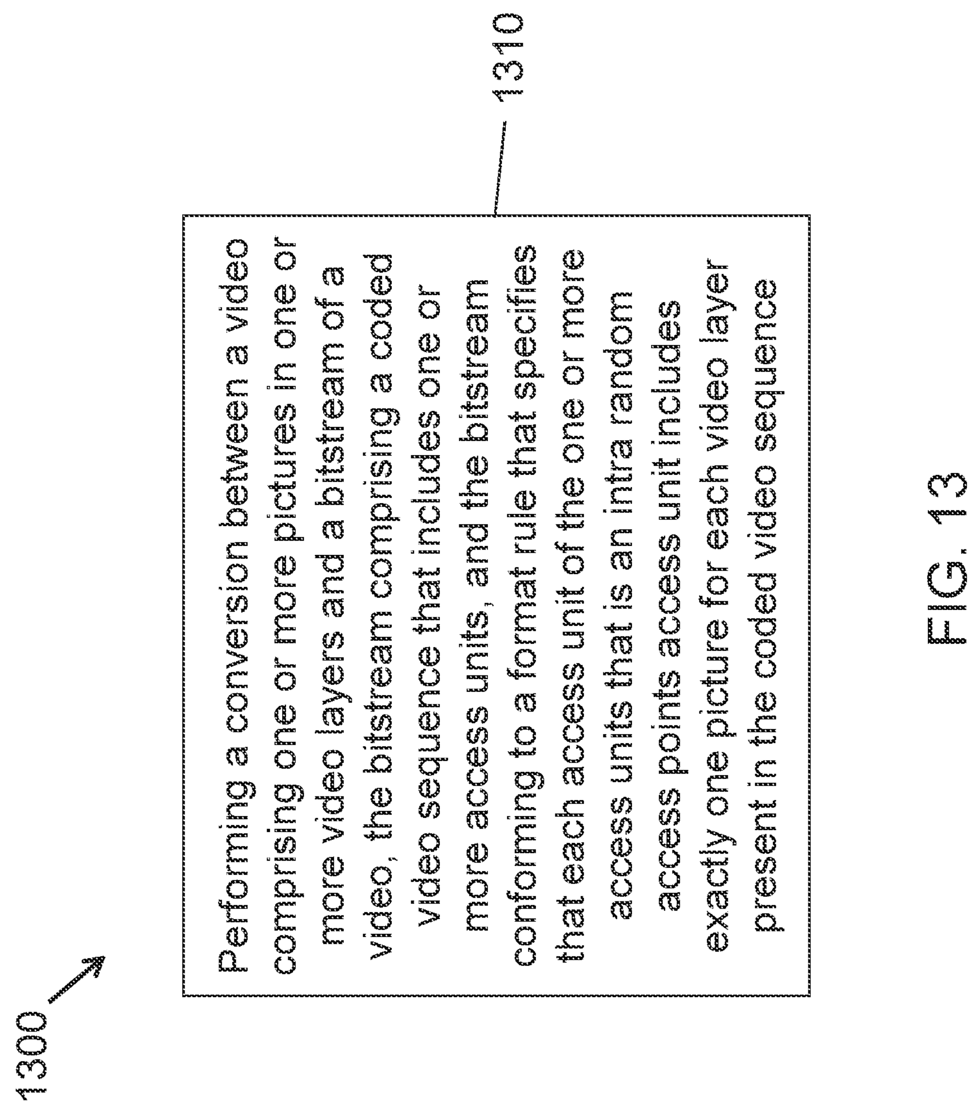

FIG. 13 shows a flowchart for an example method 1300 of video processing. The method 1300 includes, at operation 1310, performing a conversion between a video comprising one or more pictures in one or more video layers and a bitstream of a video, the bitstream comprising a coded video sequence that includes one or more access units (AUs), and the bitstream conforming to a format rule that specifies that each AU of the one or more AUs that is an intra random access points AU includes exactly one picture for each video layer present in the CVS.

A listing of solutions preferred by some embodiments is provided next.

P1. A video processing method, comprising performing a conversion between a video having one or more pictures in one or more video layers and a coded representation representing an encoded version of the video; wherein the coded representation includes one or more access units (AU); wherein the coded representation includes a syntax element if and only if an AU is of a type, wherein the syntax element indicates whether the AU includes a picture for each video layer making up a coded video sequence.

P2. The method of solution P1, wherein the type includes all AUs.

P3. The method of solution P1, wherein the type includes AUs that start a new CVS.

P4. The method of solution P1, wherein the syntax element is included in an access unit delimiter network abstraction layer unit.

P5. The method of any of solutions P1 to P4, wherein the syntax element is included in a network abstraction layer unit header.

P6. The method of any of solutions P1 to P4, wherein the syntax element is included in new a network abstraction layer unit.

P7. A video processing method, comprising performing a conversion between a video having one or more pictures in one or more video layers and a coded representation representing an encoded version of the video; wherein the coded representation includes one or more access units (AU); wherein the coded representation conforms to a format rule that specifies that each picture in a given AU carries a layer identifier that is equal to that of a first AU of a coded video sequence.

P8. A video processing method, comprising performing a conversion between a video having one or more pictures in one or more video layers and a coded representation representing an encoded version of the video; wherein the coded representation includes one or more access units (AU); wherein the coded representation includes a syntax element if and only if an AU starts a new coded video sequence.

P9. The method of solution P8, wherein the syntax element is included in an access unit delimiter network abstraction layer unit.

P10. The method of any of solutions P8 to P9, wherein the syntax element is included in a network abstraction layer unit header.

P11. The method of any of solutions P8 to P9, wherein the syntax element is included as a supplemental enhancement information.

P12. A video processing method, comprising performing a conversion between a video having one or more pictures in one or more video layers and a coded representation of the video; wherein the coded representation includes one or more access units (AU); wherein the coded representation conforms to a format rule that specifies that a starting AU for a coded video sequence includes a video picture for each video layer specified by a video parameter set or that the coded representation implicitly signals the starting AU based on a rule.

P13. A video processing method, comprising performing a conversion between a video having one or more pictures in one or more video layers and a coded representation of the video; wherein the coded representation includes one or more access units (AU); wherein the coded representation conforms to a format rule that specifies that each AU of type gradual decoding refresh (GDR) includes at least a video picture for each video layer of a coded video sequence.

P14. The method of solution P13, wherein each AU of type GDR further includes a prediction unit for each layer in the CVS and the PU comprises GDR pictures.

P15. The method of any of solutions P1 to 14, wherein the conversion comprises encoding the video into the coded representation.

P16. The method of any of solutions P1 to 14, wherein the conversion comprises decoding the coded representation to generate pixel values of the video.

P17. A video decoding apparatus comprising a processor configured to implement a method recited in one or more of solutions P1 to P16.

P18. A video encoding apparatus comprising a processor configured to implement a method recited in one or more of solutions P1 to P16.

P19. A computer program product having computer code stored thereon, the code, when executed by a processor, causes the processor to implement a method recited in any of solutions P1 to P16.

Another listing of solutions preferred by some embodiments is provided next.

A1. A method of video processing, comprising performing a conversion between a video comprising one or more pictures in one or more video layers and a bitstream of a video, wherein the bitstream comprises a coded video sequence that includes one or more access units, and wherein the bitstream further comprises a first syntax element indicating whether an access unit includes a picture for each video layer making up the coded video sequence.

A2. The method of solution A1, wherein the access unit is configured to start a new coded video sequence.

A3. The method of solution A2, wherein the picture for each video layer is an intra random access point picture or a gradual decoding refresh picture.

A4. The method of solution A1, wherein the first syntax element is included in an access unit delimiter network abstraction layer unit.

A5. The method of solution A4, wherein the first syntax element is a flag indicating whether an access unit containing an access unit delimiter is an intra random access point access unit or a gradual decoding refresh access unit.

A6. The method of solution A5, wherein the first syntax element is irap_or_gdr_au_flag.

A7. The method of solution A4, wherein the access unit delimiter network abstraction layer unit is the only access unit delimiter network abstraction layer unit present in each intra random access point access unit or gradual decoding refresh access unit when a second syntax element, which is indicative of a number of video layers specified by a video parameter set, is greater than one.

A8. The method of solution A7, wherein the second syntax element indicates a maximum allowed number of layers in each coded video sequence that refers to the video parameter set.

A9. The method of solution A1, wherein the first syntax element equaling one is indicative of all slices in the access unit comprising an identical network abstraction layer unit type in a range of IDR_W_RADL to GDR_NUT, inclusive.

A10. The method of solution A9, wherein the first syntax element equaling one and the network abstraction layer unit type being IDR_W_RADL or IDR_N_LP is indicative of the access unit being a coded video sequence start access unit.

A11. The method of solution A9, wherein a variable for each of the pictures in the access unit equaling one and the network abstraction layer unit type being CRA_NUT or GDR_NUT is indicative of the access unit being a coded video sequence start access unit.

A12. The method of solution A11, wherein the variable indicates whether pictures in a decoded picture buffer prior to a current picture in decoding order are output before the pictures are recovered.

A13. The method of solution A11, wherein the variable is NoOutputBeforeRecoveryFlag.

A14. The method of solution A1, wherein the first syntax element is included in a network abstraction layer unit header.

A15. The method of solution A1, wherein the first syntax element is included in a new network abstraction layer unit.

A16. The method of solution A15, wherein the new network abstraction layer unit is the only new network abstraction layer unit present in each intra random access point access unit or gradual decoding refresh access unit when a second syntax element, which is indicative of a number of video layers specified by a video parameter set, is greater than one.

A17. The method of solution A1, wherein the first syntax element is included in a supplementary enhancement information message.

A18. The method of solution A17, wherein the supplementary enhancement information message is the only supplementary enhancement information message present in each intra random access point access unit or gradual decoding refresh access unit when a second syntax element, which is indicative of a number of video layers specified by a video parameter set, is greater than zero.

A19. A method of video processing, comprising performing a conversion between a video comprising one or more pictures in one or more video layers and a bitstream of the video, wherein the bitstream comprises a coded video sequence that includes one or more access units, and wherein the bitstream conforms to a format rule that specifies that each picture in a given access unit carries a layer identifier that is equal to a layer identifier of a first access unit of the coded video sequence comprising the one or more video layers.

A20. A method of video processing, comprising performing, a conversion between a video comprising one or more pictures in one or more video layers and a bitstream of a video, wherein the bitstream comprises a coded video sequence that includes one or more access units, and wherein the bitstream further comprises a first syntax element indicative of an access unit of the one or more access units starting a new coded video sequence.

A21. The method of solution A20, wherein the first syntax element is included in an access unit delimiter network abstraction layer unit.

A22. The method of solution A20, wherein the first syntax element is included in a network abstraction layer unit header.

A23. The method of solution A20, wherein the first syntax element is included in a new network abstraction layer unit.

A24. The method of solution A20, wherein the first syntax element is included in a supplementary enhancement information message.

A25. A method of video processing, comprising performing a conversion between a video comprising one or more pictures in one or more video layers and a bitstream of the video, wherein the bitstream comprises a coded video sequence that includes one or more access units, and wherein the bitstream conforms to a format rule that specifies that a coded video sequence start access unit, which starts a new coded video sequence, comprises a picture for each video layer specified in a video parameter set.

A26. A method of video processing, comprising performing a conversion between a video comprising one or more pictures in one or more video layers and a bitstream of the video, wherein the bitstream comprises a coded video sequence that includes one or more access units, and wherein the bitstream conforms to a format rule that specifies that a given access unit is identified as a coded video sequence start access unit based on the given access unit being a first access unit in the bitstream or an access unit previous to the given access unit comprising end of sequence network abstraction layer units.

A27. A method of video processing, comprising performing, based on a rule, a conversion between a video comprising one or more pictures in one or more video layers and a bitstream of the video, wherein the bitstream comprises a coded video sequence that includes one or more access units, and wherein the rule specifies that side information is used to indicate whether an access unit of the one or more access units is a coded video sequence start access unit.

A28. The method of any of solutions A1 to A27, wherein the conversion comprises decoding the video from the bitstream.

A29. The method of any of solutions A1 to A27, wherein the conversion comprises encoding the video into the bitstream.

A30. A method of storing a bitstream representing a video to a computer-readable recording medium, comprising generating the bitstream from the video according to a method described in any one or more of solutions A1 to A27; and storing the bitstream in the computer-readable recording medium.

A31. A video processing apparatus comprising a processor configured to implement a method recited in any one or more of solutions A1 to A30.

A32. A computer-readable medium having instructions stored thereon, the instructions, when executed, causing a processor to implement a method recited in one or more of solutions A1 to A30.

A33. A computer readable medium that stores the bitstream generated according to any one or more of solutions A1 to A30.

A34. A video processing apparatus for storing a bitstream, wherein the video processing apparatus is configured to implement a method recited in any one or more of solutions A1 to A30.

Yet another listing of solutions preferred by some embodiments is provided next.

B1. A method of video processing, comprising performing a conversion between a video comprising one or more pictures in one or more video layers and a bitstream of a video, wherein the bitstream comprises a coded video sequence that includes one or more access units, and wherein the bitstream conforms to a format rule that specifies that each access unit of the one or more access units that is a gradual decoding refresh access unit includes exactly one picture for each video layer present in the coded video sequence.

B2. The method of solution B 1, wherein each access unit that is a gradual decoding refresh access unit includes a prediction unit for each layer present in the coded video sequence, and wherein the prediction unit for each layer includes a coded picture that is a gradual decoding refresh picture.

B3. A method of video processing, comprising performing a conversion between a video comprising one or more pictures in one or more video layers and a bitstream of a video, wherein the bitstream comprises a coded video sequence that includes one or more access units, and wherein the bitstream conforms to a format rule that specifies that each access unit of the one or more access units that is an intra random access points access unit includes exactly one picture for each video layer present in the coded video sequence.

B4. The method of any of solutions B1 to B3, wherein the conversion comprises decoding the video from the bitstream.

B5. The method of any of solutions B1 to B3, wherein the conversion comprises encoding the video into the bitstream.

B6. A method of storing a bitstream representing a video to a computer-readable recording medium, comprising generating the bitstream from the video according to a method described in any one or more of solutions B1 to B3; and storing the bitstream in the computer-readable recording medium.

B7. A video processing apparatus comprising a processor configured to implement a method recited in any one or more of solutions B1 to B6.

B8. A computer-readable medium having instructions stored thereon, the instructions, when executed, causing a processor to implement a method recited in one or more of solutions B1 to B6.

B9. A computer readable medium that stores the bitstream generated according to any one or more of solutions B1 to B6.

B10. A video processing apparatus for storing a bitstream, wherein the video processing apparatus is configured to implement a method recited in any one or more of solutions B1 to B6.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:

performing a conversion between a video comprising one or more pictures in one or more video layers and a bitstream of the video, wherein the bitstream comprises a coded video sequence that includes one or more access units, wherein the bitstream conforms to a first format rule that specifies that each access unit of the one or more access units that is a gradual decoding refresh access unit includes at least one picture for each video layer present in the coded video sequence, and wherein each access unit that is the gradual decoding refresh access unit includes a prediction unit for each layer present in the coded video sequence, and wherein the prediction unit for each layer includes a coded picture that is a gradual decoding refresh picture.

2. The method of claim 1, wherein the gradual decoding refresh access unit includes exactly one picture for each video layer present in the coded video sequence.

3. The method of claim 1, wherein the bitstream conforms to a second format rule that specifies that each access unit of the one or more access units that is an intra random access points access unit includes exactly one picture for each video layer present in the coded video sequence.

4. The method of claim 1, wherein the conversion comprises decoding the video from the bitstream.

5. The method of claim 1, wherein the conversion comprises encoding the video into the bitstream.

6. An apparatus for processing video data comprising a processor and a non-transitory memory with instructions thereon, wherein the instructions upon execution by the processor, cause the processor to:

perform a conversion between a video comprising one or more pictures in one or more video layers and a bitstream of the video, wherein the bitstream comprises a coded video sequence that includes one or more access units, wherein the bitstream conforms to a first format rule that specifies that each access unit of the one or more access units that is a gradual decoding refresh access unit includes at least one picture for each video layer present in the coded video sequence, and wherein each access unit that is the gradual decoding refresh access unit includes a prediction unit for each layer present in the coded video sequence, and wherein the prediction unit for each layer includes a coded picture that is a gradual decoding refresh picture.

7. The apparatus of claim 6, wherein the gradual decoding refresh access unit includes exactly one picture for each video layer present in the coded video sequence.

8. The apparatus of claim 6, wherein the bitstream conforms to a second format rule that specifies that each access unit of the one or more access units that is an intra random access points access unit includes exactly one picture for each video layer present in the coded video sequence.

9. The apparatus of claim 6, wherein the conversion comprises decoding the video from the bitstream.

10. The apparatus of claim 6, wherein the conversion comprises encoding the video into the bitstream.

11. A non-transitory computer-readable storage medium storing instructions that cause a processor to:

perform a conversion between a video comprising one or more pictures in one or more video layers and a bitstream of the video, wherein the bitstream comprises a coded video sequence that includes one or more access units, wherein the bitstream conforms to a first format rule that specifies that each access unit of the one or more access units that is a gradual decoding refresh access unit includes at least one picture for each video layer present in the coded video sequence, and wherein each access unit that is the gradual decoding refresh access unit includes a prediction unit for each layer present in the coded video sequence, and wherein the prediction unit for each layer includes a coded picture that is a gradual decoding refresh picture.

12. The medium of claim 11, wherein the gradual decoding refresh access unit includes exactly one picture for each video layer present in the coded video sequence.

13. The medium of claim 11, wherein the conversion comprises decoding the video from the bitstream.

14. The medium of claim 11, wherein the conversion comprises encoding the video into the bitstream.

15. The medium of claim 11, wherein the bitstream conforms to a second format rule that specifies that each access unit of the one or more access units that is an intra random access points access unit includes exactly one picture for each video layer present in the coded video sequence.

16. A non-transitory computer-readable recording medium storing a bitstream of a video which is generated by a method performed by a video processing apparatus, wherein the method comprises:

generating the bitstream of the video comprising one or more pictures in one or more video layers, wherein the bitstream comprises a coded video sequence that includes one or more access units, wherein the bitstream conforms to a first format rule that specifies that each access unit of the one or more access units that is a gradual decoding refresh access unit includes at least one picture for each video layer present in the coded video sequence, and wherein each access unit that is the gradual decoding refresh access unit includes a prediction unit for each layer present in the coded video sequence, and wherein the prediction unit for each layer includes a coded picture that is a gradual decoding refresh picture.

17. The medium of claim 16, wherein the gradual decoding refresh access unit includes exactly one picture for each video layer present in the coded video sequence.

18. The medium of claim 16, wherein the bitstream conforms to a second format rule that specifies that each access unit of the one or more access units that is an intra random access points access unit includes exactly one picture for each video layer present in the coded video sequence.

* * * * *